US012087069B2

(12) United States Patent
Chi et al.

(10) Patent No.: US 12,087,069 B2
(45) Date of Patent: Sep. 10, 2024

(54) ARTIFICIAL INTELLIGENCE-BASED ACTION RECOGNITION METHOD AND RELATED APPARATUS

(71) Applicant: TENCENT TECHNOLOGY (SHENZHEN) COMPANY LIMITED, Shenzhen (CN)

(72) Inventors: Wanchao Chi, Shenzhen (CN); Chong Zhang, Shenzhen (CN); Yonggen Ling, Shenzhen (CN); Wei Liu, Shenzhen (CN); Zhengyou Zhang, Shenzhen (CN); Zejian Yuan, Shenzhen (CN); Ziyang Song, Shenzhen (CN); Ziyi Yin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 410 days.

(21) Appl. No.: 17/516,585

(22) Filed: Nov. 1, 2021

(65) Prior Publication Data

US 2022/0051061 A1 Feb. 17, 2022

Related U.S. Application Data

(63) Continuation of application No. PCT/CN2020/114130, filed on Sep. 9, 2020.

(30) Foreign Application Priority Data

Oct. 30, 2019 (CN) .......................... 201911046992.0

(51) Int. Cl.
*G06K 9/00* (2022.01)
*G06N 3/045* (2023.01)
(Continued)

(52) U.S. Cl.
CPC ........... *G06V 30/242* (2022.01); *G06N 3/045* (2023.01); *G06V 40/20* (2022.01)

(58) Field of Classification Search
CPC .... G06V 40/10; G06V 40/103; G06V 40/107; G06V 40/11; G06V 40/113; G06V 40/28;
(Continued)

(56) References Cited

U.S. PATENT DOCUMENTS

2017/0344829 A1* 11/2017 Lan ...................... G06V 40/103
2019/0251702 A1* 8/2019 Chandler ................ G10L 15/24
(Continued)

FOREIGN PATENT DOCUMENTS

CN 104123007 A 10/2014
CN 104408461 A 3/2015
(Continued)

OTHER PUBLICATIONS

The European Patent Office (EPO) the Extended European Search Report for 20882681.8 Aug. 8, 2022 8 pages.
(Continued)

*Primary Examiner* — Atiba O Fitzpatrick
(74) *Attorney, Agent, or Firm* — ANOVA LAW GROUP PLLC

(57) ABSTRACT

An artificial intelligence-based action recognition method includes: determining, according to video data comprising an interactive object, node sequence information corresponding to video frames in the video data, the node sequence information of each video frame including position information of nodes in a node sequence, the nodes in the node sequence being nodes of the interactive object that are moved to implement a corresponding interactive action; determining action categories corresponding to the video frames in the video data, including: determining, according to the node sequence information corresponding to N con-
(Continued)

secutive video frames in the video data, action categories respectively corresponding to the N consecutive video frames; and determining, according to the action categories corresponding to the video frames in the video data, a target interactive action made by the interactive object in the video data.

19 Claims, 10 Drawing Sheets

(51) Int. Cl.
*G06V 30/242* (2022.01)
*G06V 40/20* (2022.01)

(58) Field of Classification Search
CPC .................. G06V 10/70; G06V 10/82; G06V 10/774–7796; G06V 10/87; G06V 30/19113; G06V 10/7753; G06F 3/017; G06F 18/214–2155; G06F 7/023; G06F 40/16; G06T 2207/20081; G06T 2207/20084; G06K 9/6256; G06K 9/6257; G06K 9/6259; G06N 3/02–126; G06N 20/00–20; G06N 3/045; G06N 3/0455; G06N 3/0454
See application file for complete search history.

(56) References Cited

U.S. PATENT DOCUMENTS

| | | | |
|---|---|---|---|
| 2019/0311188 A1 | 10/2019 | Qing et al. | |
| 2020/0042776 A1 | 2/2020 | Shen et al. | |
| 2020/0341580 A1* | 10/2020 | Rosenbaum | G06V 40/20 |
| 2022/0036050 A1* | 2/2022 | Chandler | G06T 7/20 |
| 2022/0101654 A1* | 3/2022 | Zhang | G06N 3/045 |

FOREIGN PATENT DOCUMENTS

| | | |
|---|---|---|
| CN | 104573665 A | 4/2015 |
| CN | 106919892 A | 7/2017 |
| CN | 106991372 A | 7/2017 |
| CN | 108764176 A | 11/2018 |
| CN | 108985259 A | 12/2018 |
| CN | 109685037 A | 4/2019 |
| CN | 109829451 A | 5/2019 |
| CN | 110070070 A | 7/2019 |
| CN | 110222551 A | 9/2019 |
| CN | 110309732 A | 10/2019 |
| CN | 110765967 A | 2/2020 |

OTHER PUBLICATIONS

Fabien Baradel et al., "Pose-conditioned Spatio-Temporal Attention for Human Action Recognition," arXiv:1703.10106v1, Mar. 29, 2017 (Mar. 29, 2017). 10 pages.

Wei Lin et al., "Beyond 2D: Fusion of Monocular 30 Pose, Motion and Appearance for Human Action Recognition," 2019 22th International Conference on Information Fusion (Fusion), ISIF—International Society of Information Fusion, Jul. 2, 2019 (Jul. 2, 2019). 8 pages.

Rong Liu et al., "Si-GCN: Structure-induced Graph Convolution Network for Skeleton-based Action Recognition," 2019 International Joint Conference on Neural Networks (IJCNN), IEEE, Jul. 14, 2019 (Jul. 14, 2019). 8 pages.

The World Intellectual Property Organization (WIPO) International Search Report for PCT/CN2020/114130 Dec. 18, 2020 6 Pages (including translation).

L. Xia et al., "View Invariant Human Action Recognition Using Histograms of 3D Joints," In Computer Vision and Pattern Recognition Workshops (CVPRW), 2012. 8 pages.

C. Feichtenhofer et al., "Convolutional Two-Stream Network Fusion for Video Action Recognition," In Computer Vision and Pattern Recognition (CVPR), 2016, pp. 1933-1941. 9 pages.

J. Carreira et al., "Quo Vadis, Action Recognition? a New Model and the Kinetics Dataset," In Computer Vision and Pattern Recognition (CVPR), 2017, pp. 6299-6308. 10 pages.

Q. Ke et al., "A New Representation of Skeleton Sequences for 3D Action Recognition," In Computer Vission and Pattern Recognition (CVPR), 2017, pp. 3288-3297. 10 pages.

J. Liu et al., "Spatio-Temporal LSTM with Trust Gates for 3D Human Action Recognition," arXiv:1607.07043, Jul. 24, 2016. 18 pages.

S. Yan et al., "Spatial Temporal Graph Convolutional Networks for Skeleton-Based Action Recognition," In AAAI Conference on Artificial Intelligence, 2018. 9 pages.

The State Intellectual Property Office of the People's Republic of China (SIPO) Office Action 1 for for 201911046992.0 Dec. 3, 2021 10 Pages (including translation).

* cited by examiner

US 12,087,069 B2

ARTIFICIAL INTELLIGENCE-BASED ACTION RECOGNITION METHOD AND RELATED APPARATUS

CROSS-REFERENCES TO RELATED APPLICATIONS

This application is a continuation application of PCT Patent Application No. PCT/CN2020/114130, filed on Sep. 9, 2021, which claims priority to Chinese Patent Application No. 201911046992.0, entitled "ARTIFICIAL INTELLIGENCE-BASED ACTION RECOGNITION METHOD AND RELATED APPARATUS" filed with the China National Intellectual Property Administration on Oct. 30, 2019, the entire contents of both of which are incorporated herein by reference.

FIELD OF THE TECHNOLOGY

The present disclosure relates to the field of image processing, and in particular, to an action recognition technology.

BACKGROUND OF THE DISCLOSURE

An action recognition technology can help smart devices understand actions of interactive objects and respond correspondingly. For example, a user can trigger a function of a smart device through a gesture. The action recognition technology is a key technology to achieve intelligent interaction.

In a related technology for action recognition, a dedicated action recognition camera, for example, a Kinect camera, is used to acquire actions made by an interactive object and perform action recognition according to the acquired data.

However, the dedicated action recognition camera is bulky and costly, which leads to limitations in intelligent interaction configuration scenarios based on action recognition.

SUMMARY

To resolve the foregoing technical problems, the present disclosure provides an artificial intelligence-based action recognition method and a related apparatus, which narrows the application range and reduces implementation costs in intelligent interaction scenarios.

Embodiments of the present disclosure discloses the following technical solutions:

According to a first aspect, an embodiment of the present disclosure provides an action recognition method, performed by a data processing device, the method including: determining, according to video data comprising an interactive object, node sequence information corresponding to video frames in the video data, the node sequence information of each video frame including position information of nodes in a node sequence, the nodes in the node sequence being nodes of the interactive object that are moved to implement a corresponding interactive action; determining action categories corresponding to the video frames in the video data, including: determining, according to the node sequence information corresponding to N consecutive video frames in the video data, action categories respectively corresponding to the N consecutive video frames; and determining, according to the action categories corresponding to the video frames in the video data, a target interactive action made by the interactive object in the video data According to a second aspect, an embodiment of the present disclosure provides an action recognition apparatus, deployed on a data processing device, the apparatus including a first determining unit, a second determining unit, and a third determining unit, where the first determining unit is configured to determine, according to video data including an interactive object, node sequence information corresponding to video frames in the video data, the node sequence information of each video frame including position information of nodes in a node sequence, the nodes in the node sequence being nodes of the interactive object that are moved to implement a corresponding interactive action; the second determining unit is configured to determine action categories corresponding to the video frames in the video data, including: determining, according to node sequence information corresponding to N consecutive video frames in the video data, action categories respectively corresponding to the N consecutive video frames; and the third determining unit is configured to determine, according to the action categories corresponding to the video frames in the video data, a target interactive action made by the interactive object.

According to a third aspect, an embodiment of the present disclosure provides an action recognition device, including a processor and a memory, where the memory is configured to store program code and transmit the program code to the processor; and the processor is configured to perform the method in the first aspect according to instructions in the program code.

According to a fourth aspect, an embodiment of the present disclosure provides a non-transitory computer-readable storage medium, configured to store program code, the program code being executed by a processor and cause the processor to perform: determining, according to video data comprising an interactive object, node sequence information corresponding to video frames in the video data, the node sequence information of each video frame including position information of nodes in a node sequence, the nodes in the node sequence being nodes of the interactive object that are moved to implement a corresponding interactive action; determining action categories corresponding to the video frames in the video data, including: determining, according to the node sequence information corresponding to N consecutive video frames in the video data, action categories respectively corresponding to the N consecutive video frames; and determining, according to the action categories corresponding to the video frames in the video data, a target interactive action made by the interactive object in the video data.

It can be seen from the foregoing technical solutions that, for the video data including the interactive object, the node sequence information corresponding to the video frames in the video data may be determined, a plurality of nodes in the node sequence are nodes used by the interactive object to implement the interactive action, and the node sequence information may reflect the position information of the nodes in the node sequence. N consecutive video frames are determined from the video data, and the action categories respectively corresponding to the N consecutive video frames are determined according to the node sequence information respectively corresponding to the N consecutive video frames, so that which interactive action the interactive object makes may be determined according to action categories corresponding to the video frames in the video data. It can be learned that action categories corresponding to a video frame are determined with reference to information carried by N consecutive video frames where the video frame is located or with reference to relevant information of the video frame in the past and/or future time, thereby introducing more effective information. Even if a non-dedicated action recognition acquisition apparatus is used to obtain the video data, this method of determining action categories corresponding to each video frame based on a set of consecutive video frames can also achieve a relatively good action recognition accuracy, thereby reducing an application range and implementation costs in intelligent interaction scenarios.

BRIEF DESCRIPTION OF THE DRAWINGS

To describe the technical solutions in the embodiments of the present disclosure or in the related art more clearly, the following briefly describes the accompanying drawings required for describing the embodiments or the related art. Apparently, the accompanying drawings in the following description show only some embodiments of the present disclosure, and a person of ordinary skill in the art may derive other drawings from the accompanying drawings without creative efforts.

DESCRIPTION OF EMBODIMENTS

Figure 1:
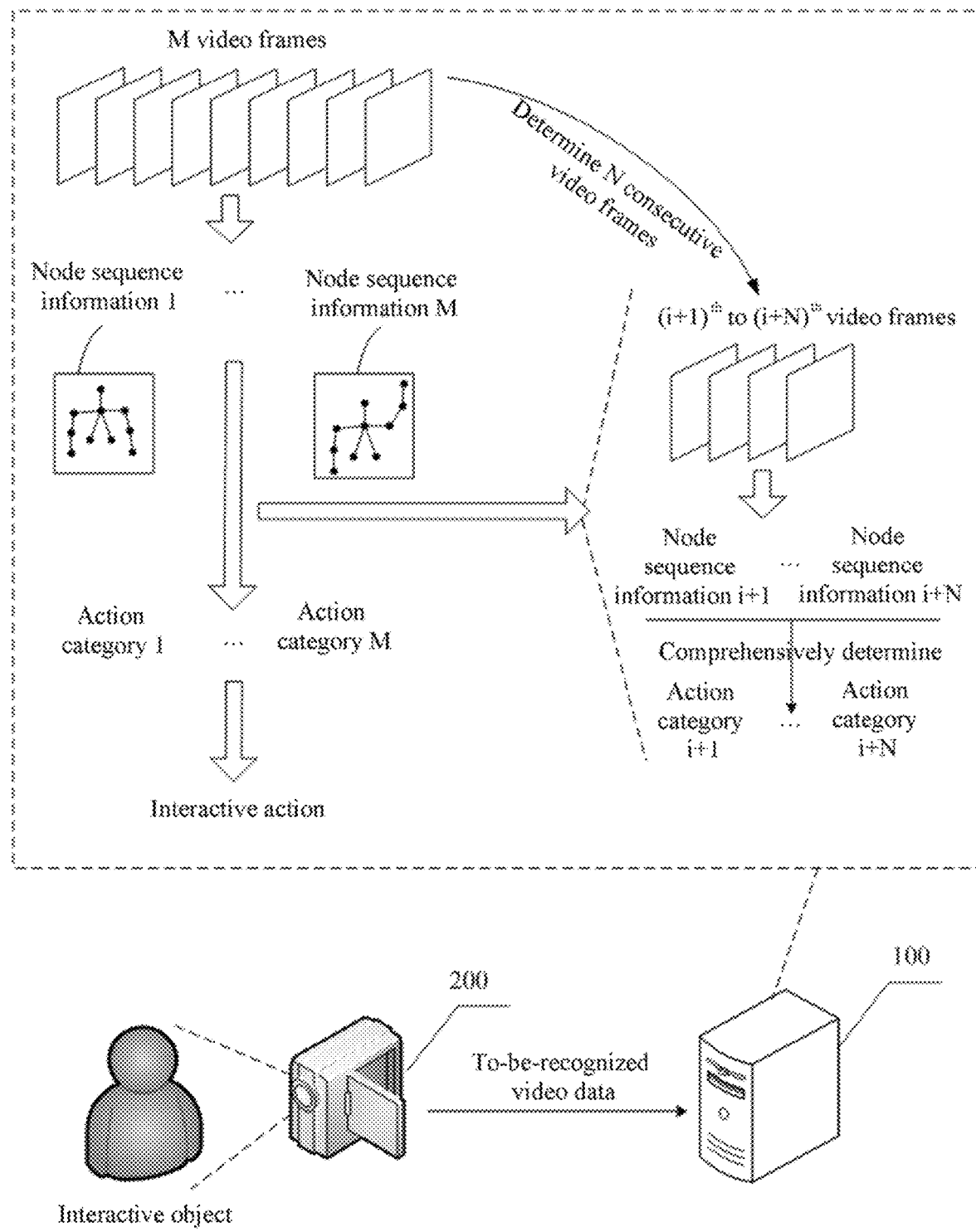
FIG. 1 is a schematic diagram of an action recognition scenario according to an embodiment of the present disclosure.

The following describes embodiments of the present disclosure with reference to the accompanying drawings.

An action recognition technology can help smart devices understand interactive actions made by interactive objects and respond correspondingly. The interactive object may be a user, or may be another object that can make actions, or may even be a robot.

Accurately recognizing the interactive actions made by the interactive objects is the key to achieving intelligent interaction. In some related technologies, a dedicated action recognition camera is often used to acquire actions made by an interactive object. Due to the powerful functions, the dedicated camera can acquire information related to interactive actions in detail, so as to achieve accurate action recognition. However, the dedicated action recognition camera also brings the problem of large size and high cost, which hinders the development of intelligent interaction.

In view of this, the embodiments of the present disclosure provide an action recognition method. Action categories corresponding to a video frame are determined according to video data with reference to information carried by N consecutive video frames where the video frame is located or with reference to relevant information of the video frame in the past and/or future time, so that even if the video data is acquired by using a non-dedicated device, this method of determining action categories corresponding to each video frame based on a set of consecutive video frames can also achieve a relatively good action recognition accuracy.

The action recognition method provided in the embodiments of the present disclosure may be implemented based on artificial intelligence (AI). AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology of computer sciences, attempts to understand essence of intelligence, and produces a new intelligent machine that can react in a manner similar to human intelligence. AI is to study the design principles and implementation methods of various intelligent machines, so that the machines can perceive, infer, and make decisions.

The AI technology is a comprehensive discipline and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. The AI software technologies mainly include several major orientations such as a computer vision (CV) technology, a speech processing technology, a natural language processing technology, and machine learning (ML)/deep learning.

In the embodiments of the present disclosure, the mainly involved AI software technologies include the orientation of the CV technology and deep learning.

For example, image processing, image semantic understanding (ISU), and the like in the CV may be involved.

For example, deep learning in the ML may be involved, including various artificial neural networks.

The action recognition method provided in the embodiments of the present disclosure may be implemented by a data processing device with a video processing capability and an action recognition capability. The data processing device may be a terminal device, or may be a server. For example, the terminal device may be a smartphone, a computer, a personal digital assistant (PDA), a tablet computer, or the like, and the server may be specifically an independent server, or may be a cluster server.

The data processing device may have a capability for implementing the CV technology. The CV is a science that studies how to enable a machine to "see", and to be specific, to implement machine vision such as recognition, tracking, and measurement for a target by using a camera and a computer in replacement of human eyes, and further perform graphic processing, so that the computer processes the target into an image more suitable for human eyes to observe, or more suitable to be transmitted to an instrument for detection. As a scientific subject, the CV studies related theories and technologies and attempts to establish an AI system that can obtain information from images or multidimensional data. The CV technology generally includes technologies such as image processing, image recognition, ISU, image retrieval, and optical character recognition (OCR).

In the embodiments of the present disclosure, the data processing device may determine various features and information related to an interactive object in video data based on the CV technology.

The data processing device may have an ML capability. ML is a multi-field interdisciplinary subject involving the probability theory, statistics, the approximation theory, convex analysis, the algorithm complexity theory, and the like. The ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning usually include technologies such as artificial neural network.

In the embodiments of the present disclosure, the action categories respectively corresponding to the N consecutive video frames by using various artificial neural network models.

FIG. 1 is a schematic diagram of an action recognition scenario according to an embodiment of the present disclosure. In FIG. 1, a server 100 is used as the foregoing data processing device. The server 100 obtains video data acquired by a video acquisition device 200, for example, a common camera, for an interactive object (a user is the interactive object in FIG. 1). The video data may be acquired and transmitted in real time to the server 100 by the video acquisition device 200.

In the scenario of this embodiment, the video data includes M video frames. Node sequence information respectively corresponding to the video frames in the video data may be determined, that is, M pieces of node sequence information may be determined from the M video frames. A plurality of nodes in the node sequence are nodes used by the interactive object to implement an interactive action, the node sequence information may reflect position information of the nodes in the node sequence, and the position information may be understood as position information of the nodes in the video frames. For example, FIG. 1 shows used nodes and position information of the nodes that can be reflected in the information carried by node sequence information 1 corresponding to a video frame 1 and node sequence information M corresponding to a video frame M.

When action categories corresponding to a video frame in the video data are determined, N consecutive video frames may be used as a set, and node sequence information corresponding to this set of video frames may be integrated to calculate the action categories respectively corresponding to this set of video frames.

FIG. 1 shows a determining method for a set of video frames. The set of video frames is N consecutive video frames from an $(i+1)^{th}$ video frame to an $(i+N)^{th}$ video frame in the M video frames. Node sequence information i+1 to i+N respectively corresponding to the N consecutive video frames is integrated, and the action categories i+1 to i+N respectively corresponding to the N consecutive video frames are calculated.

It can be learned that, action categories corresponding to a video frame are determined with reference to information carried by N consecutive video frames where the video frame is located or with reference to relevant information of the video frame in the past and/or future time. Even if a non-dedicated action recognition acquisition apparatus is used to obtain the video data, this method of determining action categories corresponding to each video frame based on a set of consecutive video frames can also achieve a relatively good action recognition accuracy.

Therefore, according to action categories corresponding to the video frames in the video data, the interactive action made by the interactive object may be determined more accurately, reducing an application range and implementation costs in intelligent interaction scenarios.

For example, in the scenario shown in FIG. 1, an interactive action of raising a left hand made by the interactive object may be determined according to the action category corresponding to the video frame.

For ease of description, in the following embodiments, the technical solutions of the present disclosure are described mainly by using a server as the foregoing data processing device.

Figure 2:
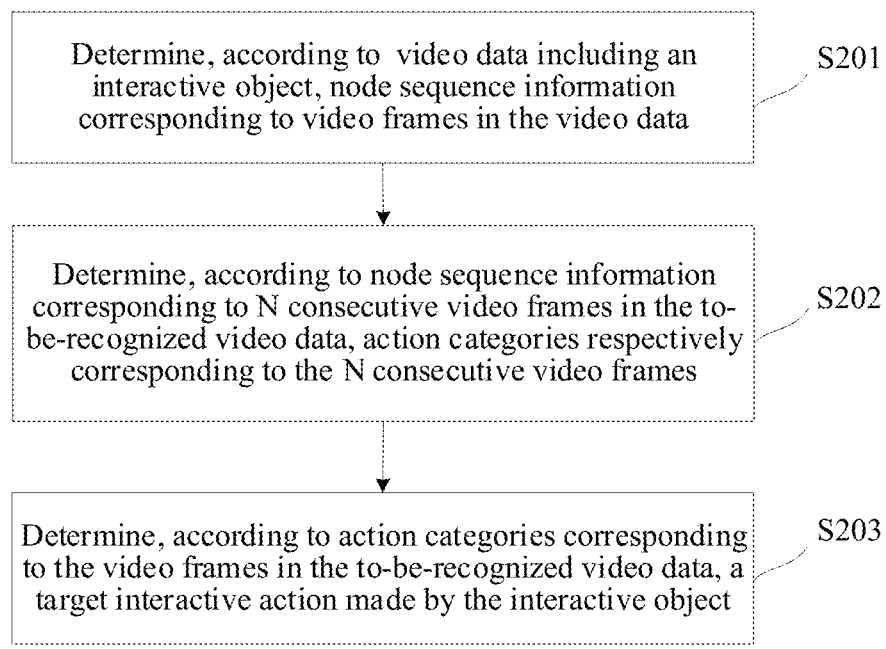
FIG. 2 is a method flowchart of an action recognition method according to an embodiment of the present disclosure.

FIG. 2 is a method flowchart of an action recognition method according to an embodiment of the present disclosure. The method includes the following steps:

S201. Determine, according to video data including an interactive object, node sequence information corresponding to video frames in the video data.

The video data may be acquired in real time by a video acquisition device on the interactive object, or may be pre-recorded according to the interactive object. This is not limited in the present disclosure. The server may determine the node sequence information corresponding to the video frames according to a to-be-recognized video.

The node sequence information may identify position information of nodes of the interactive object in the node sequence that are moved to implement an interactive action. The nodes in the node sequence are nodes of the interactive object that need to be moved to implement the interactive action, such as joint points and rotating parts.

The node sequence may be a set of the nodes extracted from the interactive object that need to be moved to implement the interactive action. Different nodes in the node sequence have certain node meanings and certain link relationships. The case shown in FIG. 1 is used as an example. The interactive object that needs to be recognized is upper limbs of a human body, the node sequence used to implement the interactive action (black dots in FIG. 1) may include a node of head, a node of neck, nodes of shoulders, nodes of elbows, nodes of wrists, and a node of crotch, and the nodes in the node sequence may have a certain link relationship (lines connecting the black dots in FIG. 1) based on a human body structure.

The position information of the nodes may reflect positions of the nodes in the node sequence. In one embodiment, the position may be a coordinate parameter relative to a fixed coordinate system, such as two-dimensional or three-dimensional coordinates in a camera coordinate system. When three-dimensional coordinates need to be determined, the video data needs to carry depth information.

Based on the foregoing description, node position information of any node i in the node sequence (in the case of three-dimensional coordinates) may be represented by ($x_i$, $y_i$, $z_i$, $conf_i$). $x_i$, $y_i$, and $z_i$ represent the three-dimensional coordinates, and $conf_i$ may reflect credibility of the three-dimensional coordinates.

The interactive object included in the video data may be an organism such as a human or an animal, or may be a model, a robot, or the like. The node sequence of different types of interactive objects for implementing interactive actions may be the same or different.

In some cases, because nodes of different types of interactive objects for implementing interactive actions may be different, determined node sequence information may be different for the different types of interactive objects.

If types of interactive actions that need to be concerned are different, even for the same type of interactive objects, the node sequence information that needs to be recognized may be different. For example, when the interactive object is a human, if the interactive actions that need to be concerned are all actions made by upper limbs, then the node sequence information that needs to be recognized may only be joint points and corresponding positions of the upper limbs of the human body. If the interactive actions that need to be concerned are all actions made by lower limbs, then the node sequence information that needs to be recognized may only be joint points and corresponding positions of the lower limbs of the human body.

When the server only needs to process a part of the interactive object, the computing efficiency of the server for node recognition can be improved.

S202. Determine, according to node sequence information corresponding to N consecutive video frames in the video data, action categories respectively corresponding to the N consecutive video frames.

Action categories corresponding to a video frame may be used to reflect which action category an action posture of the interactive object in this video frame belongs to. The action category is determined by the server in combination with information carried in the N consecutive video frames where the video frame is located.

The present disclosure does not limit an expression form of the action category, as long as the expression form can reflect which action category the action posture of the interactive object belongs to. In one embodiment, the action category may be in the form of a score or probability, and the score or probability is used to reflect a possibility that the action posture belongs to the action category.

Generally, a quantity of video frames included in the video data is greater than N, and it is difficult for the server to determine the action categories of all the video frames in the video data according to the N consecutive video frames at a time. Therefore, in this case, this step is any one of multiple processing procedures for determining action categories corresponding to each video frame in the video data. That is, the server may determine N consecutive video frames from the video data each time, and determine action categories respectively corresponding to the N consecutive video frames according to node sequence information corresponding to the N consecutive video frames, until the action categories respectively corresponding to all the video frames in the video data are determined.

S203. Determine, according to action categories corresponding to the video frames in the video data, a target interactive action made by the interactive object.

It can be seen that, for the video data including the interactive object, the node sequence information corresponding to the video frames in the video data may be determined, a plurality of nodes in the node sequence are nodes used by the interactive object to implement the interactive action, and the node sequence information may reflect the position information of the nodes in the node sequence. N consecutive video frames are determined from the video data, and the action categories respectively corresponding to the N consecutive video frames are determined according to the node sequence information respectively corresponding to the N consecutive video frames, so that which interactive action the interactive object makes may be determined according to action categories corresponding to the video frames in the video data. It can be learned that, action categories corresponding to a video frame are determined with reference to information carried by N consecutive video frames where the video frame is located or with reference to relevant information of the video frame in the past and/or future time, thereby referring to more effective information. Even if a non-dedicated action recognition acquisition apparatus is used to obtain the video data, this method of determining action categories corresponding to each video frame based on a set of consecutive video frames can also achieve a relatively good action recognition accuracy, thereby reducing an application range and implementation costs in intelligent interaction scenarios.

For S202, the present disclosure does not limit a method in which the server determines the N consecutive video frames from the video data.

In one embodiment, an embodiment of the present disclosure also provides a method of determining the N consecutive video frames from the video data based on a time window movement step and a preset time window length.

In this method, the time window has a fixed preset time window length, and the time window length may be represented by time or the number of frames. Based on a preset time window length, a set of N consecutive video frames in the preset time window length may be determined from the video data. For example, if the preset time window length is 10 frames, that is, N=10, then 10 consecutive video frames may be determined from the video data based on the preset time window length each time.

The server may move the time window in the video data according to the time window movement step, so as to select all the video frames in the video data. The time window movement step may be represented by time or the number of frames. Generally, the time window movement step is less than or equal to the preset time window length, which is N.

The server may sequentially determine the N consecutive video frames in the preset time window length from the video data according to the time window movement step.

For example, if the preset time window length is 10 frames, the time window movement step is 3 frames, and the time window is at a start position of the video data at the beginning, the server may first determine N consecutive video frames including 1st-10th frames from the video data according to the preset time window length and move the time window 3 frames backward in a time order according to the time window movement step, and then the server determines N consecutive video frames including 4th-13th frames from the video data according to the preset time window length. By repeating the foregoing operation, the server may obtain a plurality of sets of N consecutive video frames covering all the video frames of the video data from the video data based on the time window.

When the time window movement step is less than the preset time window length, a video frame in the video data exists in different sets of N consecutive video frames, so that the server may determine a plurality of action categories for the same video frame.

In the foregoing example, the 10th frame of the video data exists in N consecutive video frames including 1st-10th frames, N consecutive video frames including 4th-13th frames, N consecutive video frames including 7th-16th frames, and N consecutive video frames including 10th-19th frames. In this case, for each of the four sets of N consecutive video frames, the server determines the action categories respectively corresponding to the N consecutive video frames according to S202, so that the server determines four action categories for the 10th frame.

Because a plurality of action categories of the same video frame are determined based on different sets in which the video frame is located, different action categories are determined with reference to different relevant information or with reference to relevant information in the past and/or future time in different cases. The action category corresponding to the video frame may be comprehensively determined according to the plurality of action categories of the video frame, so as to further improve the accuracy of action recognition.

For a target video frame in the video data, S202 may include the following steps:

S2021. Obtain action categories of the target video frame that are determined in different preset time window lengths.

As described above, according to the method of determining N consecutive video frames from the video data based on the time window movement step and the preset time window length, there may be video frames in the video data that are determined by the server to have a plurality of action categories. The target video frame in this step may be such video frame with a plurality of action categories in the video data.

Action categories of the target video frame that are determined in different preset time window lengths may be the same or different.

S2022. Determine an action category of the target video frame according to the action categories determined in different preset time window lengths.

Since the action category can reflect a possibility of belonging to the action category, when the actual action category of the target video frame is determined for a plurality of action categories of the target video frame, the possibility reflected by each action category may be used as a basis for determination.

Figure 3:
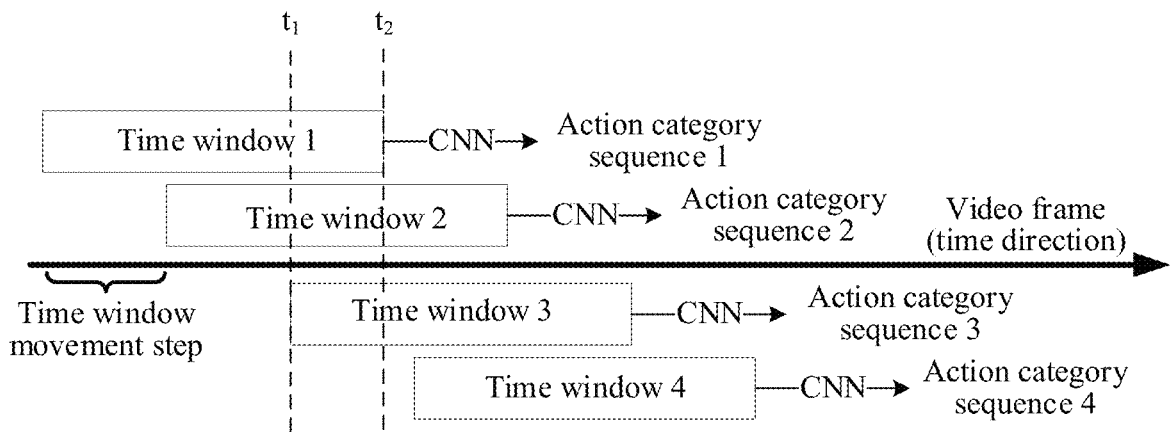
FIG. 3 is a schematic diagram of a scenario of determining consecutive video frames based on a time window and a movement step according to an embodiment of the present disclosure.

FIG. 3 is used as an example to describe this step. The scenario shown in FIG. 3 shows four time windows in a time direction of video frames played in the video data. The server first determines a first set of N consecutive video frames according to a time window 1 and then moves the time window in the time direction based on a time window movement step to obtain a time window 2, and the server determines a second set of N consecutive video frames according to the time window 2. By repeating the foregoing operation, a third set and a fourth set of N consecutive video frames are obtained based on a time window 3 and a time window 4 respectively. The server may determine action categories respectively corresponding to each set of N consecutive video frames according to the node sequence information corresponding to different sets of N consecutive video frames. N action categories in each set respectively constitute action category sequences 1 to 4 shown in FIG. 3 in order.

It can be seen that video frames are determined by the server to be in the first set, second set, and third set of N consecutive video frames between times t1 and t2, and the video frames all have corresponding action categories in the action category sequences 1 to 3.

The action category of the target video frame may be determined by the following formula:

Action category [$t1:t2$]=mean (action category 1 [$t1:t2$],action category 2 [$t1:t2$],action category 3[$t1:t2$])

The action categories 1 to 3 are respectively action categories of the target video frame in the action category sequences 1 to 3.

If a maximum possibility reflected by the action categories 1 to 3 of the target video frame exceeds a specified threshold, for example, 0.3, the action category with the maximum possibility may be taken as an actual action category ct of the target video frame. For example, the following formula may be used:

$ct$=argmax $c$(action category $c[t]$)

If a maximum possibility reflected by the action categories 1 to 3 of the target video frame does not exceed the specified threshold, it is determined that the interactive object in the target video frame does not make the interactive action.

The action category of the target video frame is determined according to the action categories determined in different preset time window lengths, which enhances reliability of determining the action category.

In this embodiment of the present disclosure, the action category of the video frame in the video data may be determined by introducing AI. For example, the server may implement the foregoing functions by using various neural network models such as a recurrent neural network (RNN) model and a convolutional neural network (CNN) model. The present disclosure does not limit the type of the neural network models.

For S202, in one embodiment, the action categories respectively corresponding to the N consecutive video frames may be determined by using a CNN model. In view of the characteristics of input data of the CNN model, in an embodiment of the present disclosure, a three-dimensional tensor suitable for being inputted to the CNN model may be determined, so that the action categories are determined by using the CNN model.

In one embodiment, S202 may include the following steps:

S2021. Generate a three-dimensional tensor according to the node sequence information corresponding to the N consecutive video frames in the video data.

Because node sequence information corresponding to a set of N consecutive video frames includes node sequence information corresponding to each of the N video frames, node sequence information corresponding to a video frame may identify position information of nodes in the node sequence that are used by the interactive object to implement an interactive action in the video frame. The nodes in the node sequence are nodes that need to be moved by the interactive object to implement the interactive action.

Figure 4:
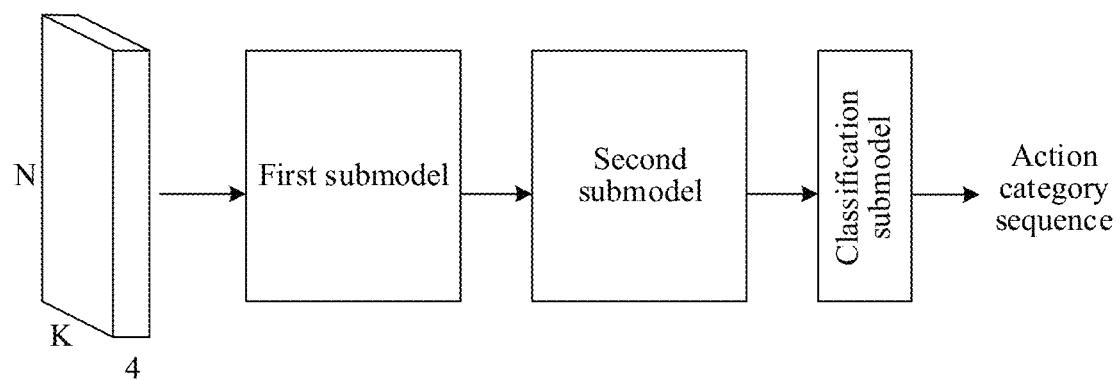
FIG. 4 is a schematic diagram of a model of recognizing an action category of a video frame by using CNN according to an embodiment of the present disclosure.

Three dimensions of the determined three-dimensional tensor may include a video frame dimension, a node dimension in the node sequence, and a position information dimension of the node. As shown in FIG. 4, an example in which a node sequence include K nodes is used, and position information of each node is represented by ($x_i$, $y_i$, $z_i$, confi), then the size of the determined three-dimensional tensor is N×K×4. The number of elements of the position information dimension of the node is related to the position information of the node, and is not limited to 4. FIG. 4 shows only the three-dimensional tensor when there are four elements in the position information of the node.

In FIG. 4, each row of the three-dimensional tensor may represent the position information of K nodes arranged in the node sequence in a video frame in N consecutive video frames.

S2022. Determine, according to the three-dimensional tensor, the action categories respectively corresponding to the N consecutive video frames by using a convolutional neural network (CNN) model.

An action category sequence constituted by the action categories respectively corresponding to the N consecutive video frames may be determined by using the CNN model according to the three-dimensional tensor used to represent the node sequence information of the N consecutive video frames.

In one embodiment, the CNN model used in S2022 includes a first submodel, a second submodel, and a classification submodel. A link relationship among the three submodels may be shown in FIG. 4. For the first submodel, an input is a three-dimensional tensor, and an output is used as an input of the second submodel. An output of the second submodel is used as an input of the classification submodel.

The first submodel is used for determining an action posture feature of the interactive object in any one of the N consecutive video frames according to the three-dimensional tensor.

The first submodel (Spatial CNN) may be a CNN structure, which can extract a feature representation of the action posture of the interactive object from a relative position relationship between nodes of the interactive object in a short time window.

The second submodel is used for determining a change rule of a time-varying action posture of the interactive object in the N consecutive video frames according to the action posture feature.

The second submodel (Temporal CNN) may be a CNN structure, which describes the change rule of the time-varying action posture of the interactive object in a longer time window.

The classification submodel is used for determining the action categories respectively corresponding to the N consecutive video frames according to the change rule. The action categories respectively corresponding to the N consecutive video frames may constitute the action category sequence, that is, the classification submodel outputs the action category sequence.

To improve the accuracy of the CNN model in determining the action category, an attention mechanism may be introduced into the CNN model to improve the capability of the model to extract effective information related to action recognition.

In one embodiment, the first submodel and the second submodel may integrate the attention mechanism in a residual link manner. There are different methods for integrating the attention mechanism by the first submodel and the second submodel, which are described with reference to figures.

Optionally, the first submodel may include a first attention module, a feature proportion of a target node in the action posture feature is increased through guidance of the first attention module to the first submodel, and the target node are a node in the node sequence whose motion amplitude in adjacent video frames is greater than a preset distance. The nodes whose motion amplitude in adjacent video frames is greater than the preset distance are more likely to be related to the interactive action made by the interactive object, and are effective information with high value for action recognition. The accuracy of determining the action category is improved by increasing the feature proportion of the target node.

Figure 5A:
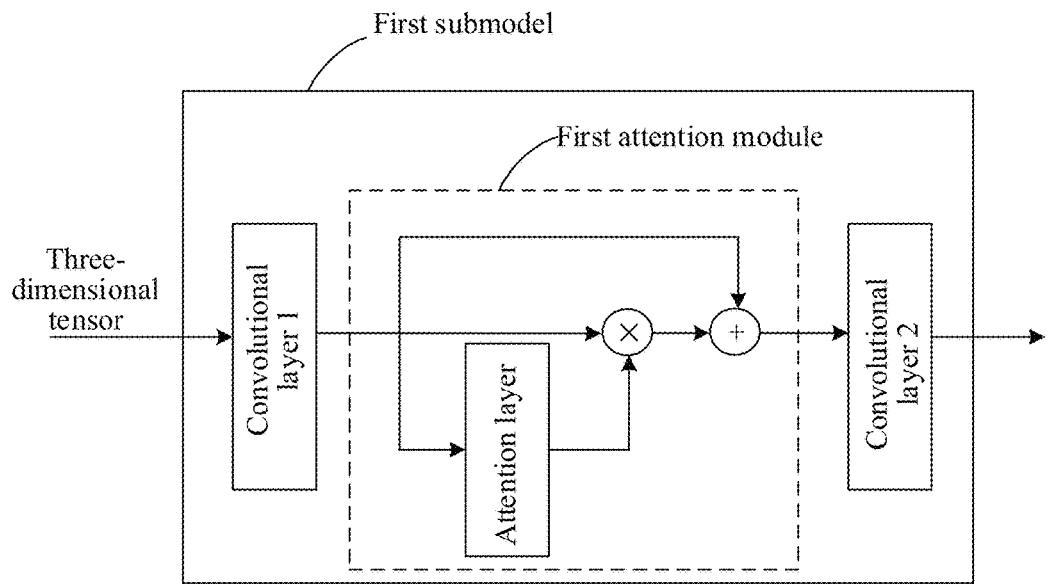
FIG. 5A is a model structure diagram of a first submodel according to an embodiment of the present disclosure.

FIG. 5A shows the first submodel integrating the attention mechanism (by the first attention module). For ease of description, two convolutional layers, namely a convolutional layer 1 and a convolutional layer 2, are set in the first submodel, and the first attention module (shown by the dashed box in the figure) is set between the two convolutional layers.

The attention mechanism for the action posture is introduced after the convolutional layer 1. In a branch where the attention mechanism is located, changes of features at different positions on the action posture of the interactive object in a short time window are captured by a layer of convolution in the time dimension, and the model is guided to pay attention to the position with a relatively large motion amplitude in a short time when the action posture features of the interactive object are extracted.

Optionally, the second submodel may include a second attention module, and through guidance of the second attention module to the second submodel, the change rule of the time-varying action posture in any frame is determined with reference to information corresponding to a plurality of frames preceding the frame and a plurality of frames subsequent to the frame. By using the second attention module, the change rule of the time-varying action posture may be determined with reference to more information corresponding to previous and subsequent video frames, so as to improve the accuracy of determining the action category.

Figure 5B:
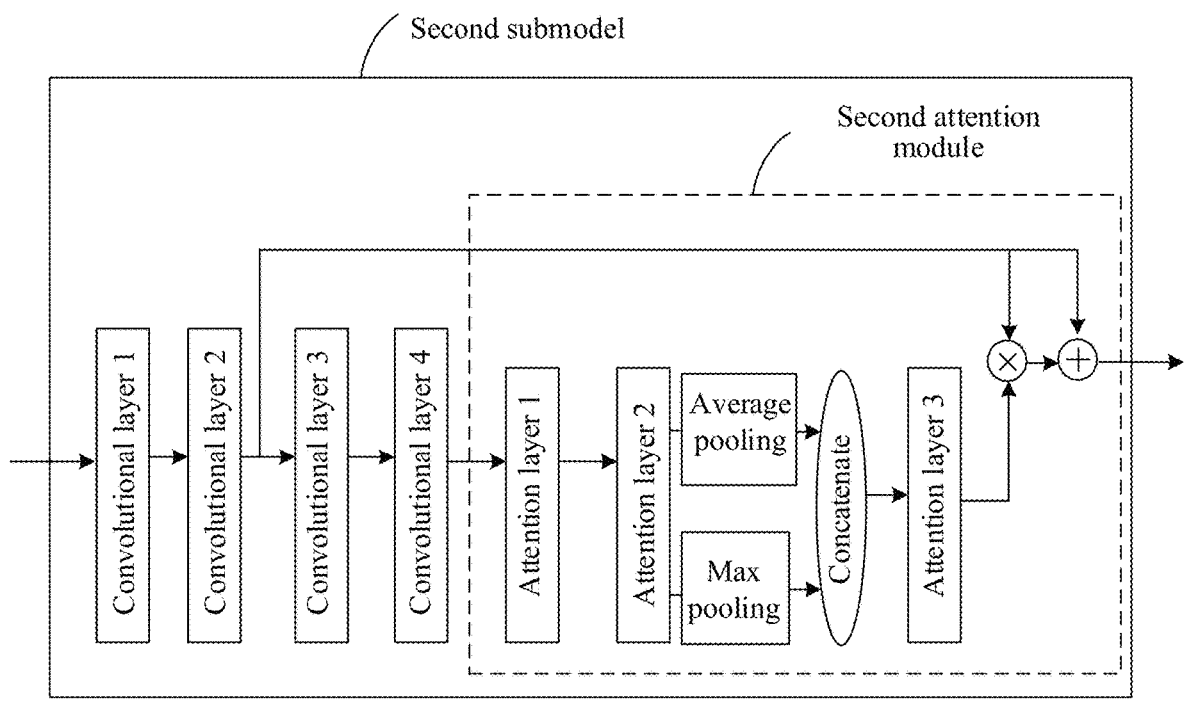
FIG. 5B is a model structure diagram of a second submodel according to an embodiment of the present disclosure.

FIG. 5B shows the first submodel integrating the attention mechanism (by the second attention module). For ease of description, four convolutional layers, namely convolutional layers 1-4, are set in the second submodel, and the first two convolutional layers include a downsampling operation to perceive a large time window in a shallow network.

The second attention module (shown by the dashed box in the figure) is set after the fourth convolutional layer. The second attention module includes three attention layers, and the attention layer can be implemented by the convolutional layer. Two sets of pooling layers and a concatenate layer that concatenates outputs of the two sets of pooling layers are set between attention layers 2 and 3. An attention layer 1 obtains a larger receptive field than a main network by further downsampling, and has a more accurate grasp of semantic information included in an entire sequence, which is beneficial to guiding the model to select a feature before a final layer of classification.

The model parameters used by the CNN model in the embodiments of the present disclosure may be shown in the following table:

| Input | Layer | Convolution kernel | Step | Channel I/O | Output size | Output |
|---|---|---|---|---|---|---|
| CNN model | | | | | | |
| P (Three-dimensional tensor) | s_conv1 (convolutional layer 1 of first submodel) | 3 × 5 | 1 × 2 | 4/8 | N × ½K | $F_1^S$ |
| $F_1^S$ | position-wise att. (first attention module) | / | / | / | N × ½K | $F_2^S$ |
| $F_2^S$ | s_conv2 (convolutional layer 2 of first submodel) | 3 × ½K | 1 × 1 | 8/32 | N × 1 | $F_3^S$ |
| $F_3^S$ | t_conv1 (convolutional layer 1 of second submodel) | 5 × 1 | 2 × 1 | 32/32 | ½N × 1 | $F_1^t$ |
| $F_1^t$ | t_conv2 (convolutional layer 2 of second submodel) | 5 × 1 | 2 × 1 | 32/64 | ¼N × 1 | $F_2^t$ |
| $F_2^t$ | t_conv3 (convolutional layer 3 of second submodel) | 5 × 1 | 1 × 1 | 64/64 | ¼N × 1 | $F_3^t$ |
| $F_3^t$ | t_conv4 (convolutional layer 4 of second submodel) | 5 × 1 | 1 × 1 | 64/64 | ¼N × 1 | $F_4^t$ |
| $F_2^t, F_4^t$ | channel-wise att. (second attention module) | / | / | / | ¼N × 1 | $F_5^t$ |
| $F_5^t$ | Classification (classification submodel) | 1 × 1 | 1 × 1 | 64/C | ¼N × 1 | score (action category) |
| position-wise att. (first attention module) | | | | | | |
| $F_1^S$ | p_att_conv1 (attention layer) | 5 × 1 | 1 × 1 | 8/1 | N × ½K | $F_1^{p\_att}$ |
| $F_1^S, F_1^{p\_att}$ | Multiply | / | / | / | N × ½K | $F_2^{p\_att}$ |
| $F_1^S, F_2^{p\_att}$ | Add | / | / | / | N × ½K | $F_2^S$ |
| channel-wise att. (second attention module) | | | | | | |
| $F_2^t$ | c_att_conv1 (attention layer 1) | 5 × 1 | 2 × 1 | 64/64 | ⅛N × 1 | $F_1^{c\_att}$ |
| $F_1^{c\_att}$ | c_att_conv2 (attention layer 2) | 5 × 1 | 1 × 1 | 64/64 | ⅛N × 1 | $F_2^{c\_att}$ |
| $F_2^{c\_att}$ | avg_pool (average pooling layer) | / | / | / | 1 × 1 | $F_{avg}^{c\_att}$ |
| $F_2^{c\_att}$ | max_pool (max pooling layer) | / | / | / | 1 × 1 | $F_{max}^{c\_att}$ |
| $F_{avg}^{c\_att}, F_{max}^{c\_att}$ | Concatenate (concatenate layer) | / | / | / | 1 × 1 | $F_3^{c\_att}$ |
| $F_3^{c\_att}$ | c_att_conv3 (attention layer 3) | 1 × 1 | 1 × 1 | 128/64 | 1 × 1 | $F_4^{c\_att}$ |
| $F_4^t, F_4^{c\_att}$ | Multiply | / | / | / | ¼N × 1 | $F_5^{c\_att}$ |
| $F_4^t, F_5^{c\_att}$ | Add | / | / | / | ¼N × 1 | $F_5^t$ |

The foregoing CNN model may be trained as follows.

a) Construct a data set: First, interactive action categories of interactive objects in an intelligent interaction rule are defined according to actual application requirements, and video data of the interactive objects performing preset interactive actions is acquired by using a depth camera. A start time, an end time, and a performed action category of each interactive action performed by the interactive object in each video are identified to obtain the action category of each frame in the video as supervision information for training the CNN network.

Node sequence information of the interactive object is extracted from the acquired video as input data for training the CNN network.

b) Generate training samples: For each video, a fixed-length time interval is selected each time by using a sliding window, and the node sequence information in the time interval and the action category of each video frame are intercepted as a training sample. Then, the sliding window is moved by a fixed step, and a corresponding training sample as above is intercepted in a next time interval.

For each training sample, when a proportion of a duration of an interactive action that appears in the sliding window to a duration of the sliding window exceeds a certain threshold, it is considered that the part of the interactive action that appears in the sliding window is relatively complete and recognizable, and the part of the interactive action is pointed out in the supervision information of the training sample. Otherwise, it is considered that the part of the interactive action that appears in the sliding window is not complete and recognizable, and the part of the interactive action is omitted in the supervision information of the training sample.

c) Loss function and optimization method: Cross entropy is used as a loss function during model training, and the loss function of each frame in the sequence is superimposed. The loss function is shown as follows:

$$L = \sum_{t=1}^{T} CE(\hat{y}_t, y_t)$$

T represents a length of a sample sequence, CE represents a cross entropy loss function, and $\hat{y}_t$ and $y_t$ respectively represent probability distributions of the action category in supervision information and a prediction result of a $t^{th}$ frame.

An Adam optimization algorithm (an algorithm for training neural networks) may be used during training. In the hyperparameter settings, a basic learning rate is set to 0.001, a batch size is set to 256, and a training cycle number is 60.

d) Data enhancement method: The following three data enhancement methods may be used in combination during training.

For each interactive action, a slight disturbance is applied to start and end time points of the interactive action with a certain probability. Before the start of each training cycle, training samples are regenerated according to the disturbed identified information.

Before each fixed-length node sequence information in the training sample is inputted to the model, a uniform disturbance is applied to a perspective of a human skeleton relative to a camera in the entire sequence.

Before each fixed-length skeleton sequence in the training sample is inputted to the model, a uniform disturbance is applied to a distance (the $z_i$ component in joint point coordinates) between the human skeleton and the camera in the entire sequence.

e) Adjust a proportion of positive and negative samples in training: According to the standard of generating the supervision information of the training samples in b), if there is no defined action in the supervision information of a training sample, the training sample is used as a negative sample; otherwise, the training sample is used as a positive sample.

In each training cycle, all the positive samples and a part of the negative samples are put into training, so that a ratio of the quantity of the positive samples and negative samples participating in training in the cycle is about 2.5:1.

In this embodiment of the present disclosure, the node sequence information of the video frame in the video data may be determined by introducing AI. For example, the server may implement the foregoing functions by using various neural network models such as a recurrent neural network (RNN) model and a convolutional neural network (CNN) model. The present disclosure does not limit the type of the neural network models.

For S201, in one embodiment, the node sequence information corresponding to the video frames in the video data may be determined by using a node recognition model, including the following steps:

S2011. Extract an image feature of the video frames in the video data.

The image feature in a video frame may reflect various information related to an image in the video frame, and the determined image feature may be in the form of a multi-dimensional vector. The image feature may be extracted from the video frame by a feature extractor. For example, the feature extractor may be a deep convolutional neural network model.

S2012. Determine, according to the image feature, the node sequence information corresponding to the video frames in the video data by using a node recognition model.

In this step, this embodiment of the present disclosure provides a node recognition model. The node recognition model may process the foregoing image feature to obtain the node sequence information corresponding to the video frame.

Figure 6:
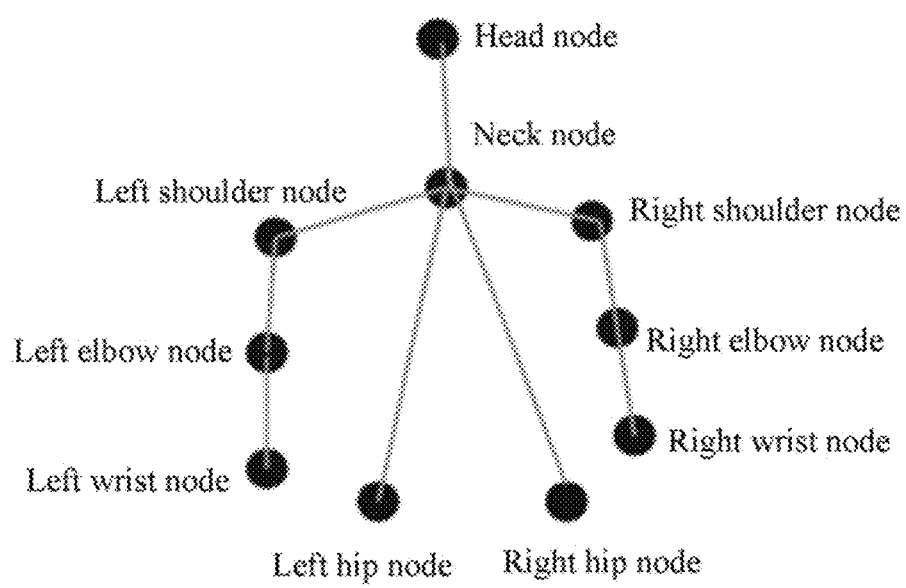
FIG. 6 is a schematic diagram of node sequence information corresponding to an upper body of a user according to an embodiment of the present disclosure.

To improve the efficiency of determining node sequence information and reduce the model scale and parameter complexity, in this embodiment of the present disclosure, the node recognition model may be used to recognize the node sequence information in the specified part of the interactive object, and the specified part may be a part of the interactive object instead of the entire interactive object. For example, when the interactive object is a user, the specified part may be a part of a body structure of the user, such as an upper body, a lower body, arms, and face. Compared with the entire interactive object, the specified part needs to recognize fewer nodes, so that the recognition speed thereof is higher. For example, the node sequence information of the upper body of the user shown in FIG. 6 includes position information of and a link relationship among 10 nodes. These 10 nodes include a head node, a neck node, left and right shoulder nodes, left and right elbow nodes, left and right wrist nodes, and left and right hip nodes, which are fewer compared with nodes of the entire body of the user.

Since the recognized region is small, and the quantity of nodes is generally small, the scale of the node recognition model provided by this embodiment of the present disclosure may be set to be small, and the recognition speed of the node sequence information is high, so that the real-time performance of action recognition may be ensured.

For the specified part, the quantity of nodes that need to be recognized may be determined based on application scenarios, and the quantity of nodes that need to be recognized for different application scenarios may be different to adapt to various application scenarios.

In one embodiment, a node recognition model provided in an embodiment of the present disclosure may be a multi-level CNN model.

That is, the node recognition model includes a plurality of layers of prediction submodels, any layer of prediction submodel includes a node prediction module and a link prediction module, the node prediction module is used for determining position information of nodes in the video frames, and the link prediction module is used for determining link information between nodes.

That is, a layer of prediction submodel may include two branches, one branch is used to predict nodes, and the other branch is used to predict link information among the nodes, which are respectively implemented by a node prediction module and a link prediction module.

Figure 7:
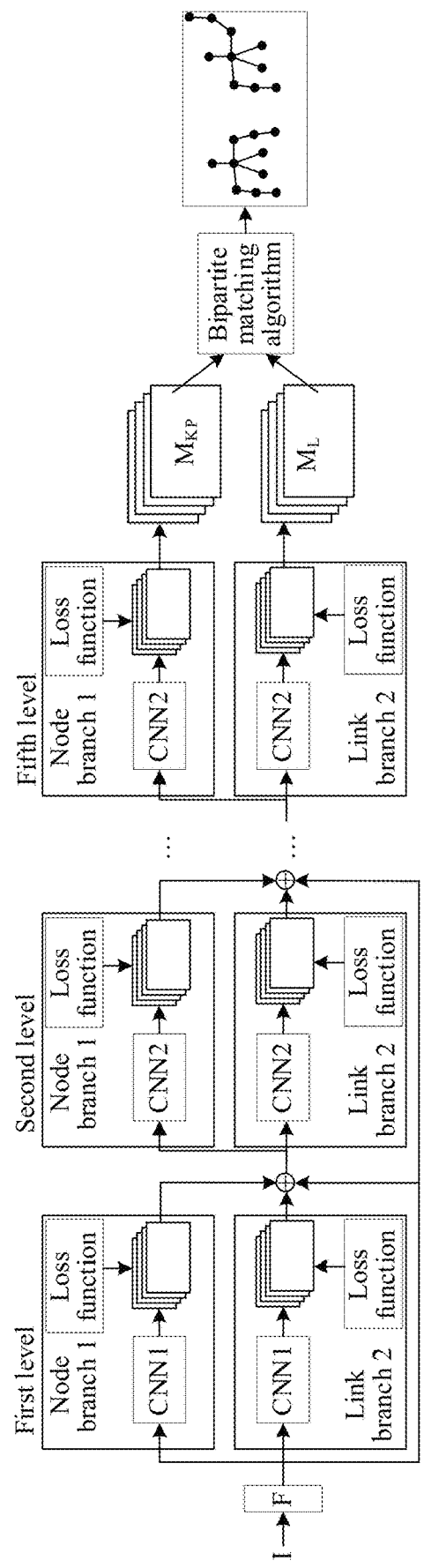
FIG. 7 is a model architecture diagram of a node recognition model according to an embodiment of the present disclosure.

For example, FIG. 7 shows a possible model architecture of the node recognition model. In FIG. 7, the node recognition model includes a five-level CNN submodel, and each level includes a node branch 1 and a link branch 2. An input of the first-level CNN submodel is the image feature extracted from video data I by the deep neural network (that is, a feature extractor F in FIG. 7).

Two sets of confidence maps are obtained by using the five-level CNN submodel, which are MKP used to identify position information of nodes and ML used to identify link information among the nodes. A detection result of a human and 2D joint points in an RGB image is obtained through a bipartite matching algorithm.

The parameter configuration of the models shown in FIG. 7 may be shown in the following tables:

TABLE 1-1

Parameter configuration of feature extractor Feature Extractor (F)

| Input | Layer | Convolution kernel | Step | Channel I/O | Output size | Output |
|---|---|---|---|---|---|---|
| I | Conv_1_1 | 3 × 3 | 1 | 3/16 | H × W | $F_0$ |
|  | Conv_1_2 | 3 × 3 | 1 | 16/16 | H × W |  |
|  | MaxP_1 | 3 × 3 | 2 | 16/16 | ½H × ½W |  |
|  | Conv_2_1 | 3 × 3 | 1 | 16/32 | ½H × ½W |  |
|  | Conv_2_2 | 3 × 3 | 1 | 32/32 | ½H × ½W |  |
|  | MaxP_2 | 3 × 3 | 2 | 32/32 | ¼H × ¼W |  |
|  | Conv_3_1 | 3 × 3 | 1 | 32/64 | ¼H × ¼W |  |
|  | Conv_3_2 | 3 × 3 | 1 | 64/64 | ¼H × ¼W |  |
|  | Conv_3_3 | 3 × 3 | 1 | 64/64 | ¼H × ¼W |  |
|  | Conv_3_4 | 3 × 3 | 1 | 64/64 | ¼H × ¼W |  |
|  | MaxP_3 | 3 × 3 | 2 | 64/64 | ⅛H × ⅛W |  |

TABLE 1-2

Parameter configuration of first-level prediction submodel (CNN1 Predictor) of node recognition model

| Input | Layer | Convolution kernel | Step | Channel I/O | Output |
|---|---|---|---|---|---|
| CNN1 Predictor-Branch 1 (Output size = ⅛ H × ⅛ W) Node branch 1 ||||||
| $F_0$ | Conv_1_$B_{1\_1}$ | 3 × 3 | 1 | 64/64 | $F_1\_B_1$ |
|  | Conv_1_$B_{1\_2}$ | 3 × 3 | 1 | 64/64 |  |
|  | Conv_1_$B_{1\_3}$ | 3 × 3 | 1 | 64/64 |  |
|  | Conv_1_$B_{1\_4}$ | 1 × 1 | 1 | 64/64 |  |
|  | Conv_1_$B_{1\_5}$ | 1 × 1 | 1 | 64/11 |  |
| CNN1 Predictor-Branch 2 (Output size = ⅛ H × ⅛ W) link branch 2 ||||||
| $F_0$ | Conv_1_$B_{2\_1}$ | 3 × 3 | 1 | 64/64 | $F_1\_B_2$ |
|  | Conv_1_$B_{2\_2}$ | 3 × 3 | 1 | 64/64 |  |
|  | Conv_1_$B_{2\_3}$ | 3 × 3 | 1 | 64/64 |  |
|  | Conv_1_$B_{2\_4}$ | 1 × 1 | 1 | 64/64 |  |
|  | Conv_1_$B_{2\_5}$ | 1 × 1 | 1 | 64/18 |  |

TABLE 1-3

Parameter configuration of second-level to fifth-level prediction submodels (CNN2 Predictor) of node recognition model

| Input | Layer | Convolution kernel | Step | Channel I/O | Output |
|---|---|---|---|---|---|
| CNN2 Predictor-Branch 1($K^{th}$ stage, 5 ≥ K ≥ 2) Node branch 1 ||||||
| $F_0$ + $F_{K-1}\_B_1$ + $F_{K-1}\_B_2$ | Conv_K_$B_{1\_1}$ | 5 × 5 | 1 | 64/64 | $F_K\_B_1$ |
|  | Conv_K_$B_{1\_2}$ | 5 × 5 | 1 | 64/64 |  |
|  | Conv_K_$B_{1\_3}$ | 5 × 5 | 1 | 64/64 |  |
|  | Conv_K_$B_{1\_4}$ | 5 × 5 | 1 | 64/64 |  |
|  | Conv_K_$B_{1\_5}$ | 1 × 1 | 1 | 64/64 |  |
|  | Conv_K_$B_{1\_6}$ | 1 × 1 | 1 | 64/11 |  |
| CNN2 Predictor-Branch 2($K^{th}$ stage, 5 ≥ K ≥ 2) link branch 2 ||||||
| $F_0$ + $F_{K-1}\_B_1$ + $F_{K-1}\_B_2$ | Conv_K_$B_{2\_1}$ | 5 × 5 | 1 | 64/64 | $F_K\_B_2$ |
|  | Conv_K_$B_{2\_2}$ | 5 × 5 | 1 | 64/64 |  |
|  | Conv_K_$B_{2\_3}$ | 5 × 5 | 1 | 64/64 |  |

TABLE 1-3-continued

Parameter configuration of second-level to fifth-level prediction submodels (CNN2 Predictor) of node recognition model

| Input | Layer | Convolution kernel | Step | Channel I/O | Output |
|---|---|---|---|---|---|
|  | Conv_K_$B_{2\_4}$ | 5 × 5 | 1 | 64/64 |  |
|  | Conv_K_$B_{2\_5}$ | 1 × 1 | 1 | 64/64 |  |
|  | Conv_K_$B_{2\_6}$ | 1 × 1 | 1 | 64/18 |  |

As mentioned in the related description of S201, for different application scenarios, the node recognition model may determine the two-dimensional or three-dimensional position information of the nodes in the node sequence. When the three-dimensional position information needs to be recognized, correspondingly, the video data needs to have depth information to provide the data of the node in the depth direction, and the depth information may be carried in the depth image of the video data.

By obtaining the depth information of the node, in addition to more accurate action recognition, the role of determining and recognizing the interactive object may also be achieved. For example, when the video data includes a plurality of users, a user closest to a video acquisition device may be determined as the actual interactive object based on the depth information.

Figure 8:
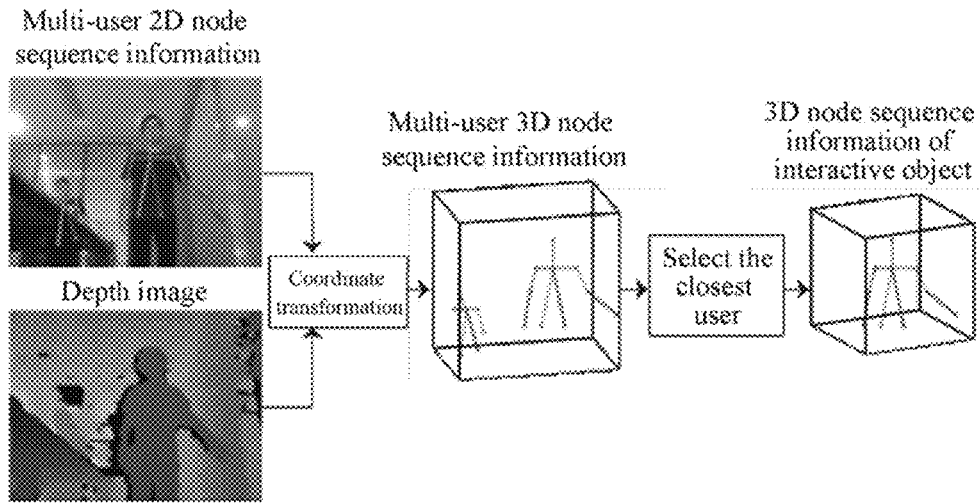
FIG. 8 is a schematic diagram of a scenario of determining an interactive object by combining depth information according to an embodiment of the present disclosure.

For example, as shown in FIG. 8, the video data includes two users, and multi-user 3D node sequence information is obtained through coordinate conversion with multi-user 2D node sequence information based on the depth image. Since the distance between the two users and the video acquisition device may be determined based on the depth information, the user closest to the video acquisition device may be determined as the interactive object, and the node sequence information of the other user may be eliminated, avoiding useless data for action recognition.

The node recognition model in this embodiment of the present disclosure may be obtained by training in the following manner.

An example in which the interactive object is a user is used. First, the feature extractor network is pre-trained on an ImageNet data set (a large-scale visualization database for visual object recognition software research), and network parameters in a pre-training result are loaded into a node recognition network for fine-tuning. The entire node recognition network is trained on a COCO2017 data set (a large-scale image data set designed for object detection, segmentation, human key point detection, semantic segmentation, and caption generation). An Adam optimization algorithm (an algorithm for training neural networks) may be used during training. In the hyperparameter settings, a basic learning rate is set to 0.0001, a batch size is set to 8, and a training cycle number is 60.

The L2 norm is used as a loss function during network training, and is applied to each level of prediction submodel of the overall network structure. The loss function is shown as follows:

$$f = \sum_{n=1}^{N} (f_1^n + f_2^n)$$

$f_1^n$ and $f_2^n$ respectively represent the L2 distance between the prediction result of the confidence map outputted by the node prediction module (in Branch 1) and the link prediction module (in Branch 2) and the corresponding true value under an nth-level prediction submodel. In the present disclosure, the value of N is 5.

In the embodiments corresponding to FIG. 2 in the present disclosure, by performing S203, the interactive action made by the interactive object may be determined according to action categories corresponding to the video frames in the video data.

In one embodiment, an embodiment of the present disclosure provides a method for determining whether an interactive object makes an interactive action. In this method, when it is determined by the action category that the interactive object is likely to make a certain interactive action, the interactive action is not directly determined, but further refers to whether the interactive object continues to make the interactive action, reducing the possibility of misjudgment due to calculation errors of the action category or unintentional actions of the interactive object, and improving the robustness of the entire system.

Optionally, S203 may include the following steps:

S2031. Calculate a feature value based on an order of the video frames according to action categories corresponding to the video frames in the video data.

That is, the feature value is calculated according to the order of the video frames, so that the accumulated feature value may be calculated to reflect the continuity of the action category in the time dimension. When the action categories corresponding to the same interactive action appear continuously according to the order of the video frames, the feature value accumulates more and more. When the action categories do not appear continuously, the accumulated feature value is not very large.

In this embodiment of the present disclosure, corresponding feature values are respectively set for the action categories of different interactive actions. When the action categories corresponding to the video frames are sequentially obtained according to the order of the video frames, the feature value is increased as the action category corresponding to the interactive action appears, and the feature value is reduced as the action category corresponding to the interactive action does not appear.

For example, the action categories corresponding to four consecutive frames from an $i^{th}$ frame to an $(i+3)^{th}$ frame all correspond to the same interactive action a, and then the feature value corresponding to the interactive action a continues to accumulate and increase. The action category corresponding to an $(i+4)^{th}$ frame an interactive action b, then the feature value corresponding to the interactive action b is increased, and the feature value corresponding to the interactive action a is reduced. The action category corresponding to an $(i+5)^{th}$ frame an interactive action a, then the feature value corresponding to the interactive action a is increased, and the feature value corresponding to the interactive action b is reduced.

S2032. Determine, when an accumulated feature value of a target action category reaches a trigger threshold, the interactive action corresponding to the target action category made by the interactive object.

When the accumulated feature value of the target action category is high and reaches the trigger threshold, it can be understood that the action categories of a plurality of consecutive video frames obtained closest to each other are the target action category, which achieves certain continuity and persistence. Thereby, it can be determined that the interactive object indeed makes the interactive action corresponding to the target action category intentionally, which has the intention of interacting with the data processing device through the interactive action. From this, it can be determined that the interactive object makes the interactive action corresponding to the target action category.

After it is determined that the interactive object makes the interactive action corresponding to the target action category, if the interactive object continues to make the interactive action, the corresponding feature value continues to be greater than the trigger threshold, which may cause the data processing device to determine that the interactive object has been repeatedly making the same interactive action in some cases, thereby making an incorrect response based on this.

To avoid the foregoing cases, a corresponding state may be set for the action category corresponding to the same interactive action, and the state may be classified into a triggered state and a to-be-triggered state.

In the triggered state, when the accumulated feature value of the target action category reaches the trigger threshold, the operation of determining the interactive action corresponding to the target action category made by the interactive object is not performed.

In the to-be-triggered state, when the accumulated feature value of the target action category reaches the trigger threshold, the interactive action corresponding to the target action category made by the interactive object is determined.

When the feature value of the target action category is always low, the state thereof is the to-be-triggered state. When the accumulated feature value corresponding to the target action category reaches the trigger threshold, the state corresponding to the target action category may be switched from the to-be-triggered state to the triggered state. Since the interactive action corresponding to the target action category made by the interactive object is not be repeatedly determined in the triggered state, the case of repeatedly determining the interactive action is avoided.

For example, if it is determined that the feature value of the target action category reaches the trigger threshold according to the target action category corresponding to an $i^{th}$ video frame of the video data, the data processing device determines that the interactive object makes the interactive action corresponding to the target action category, and the state corresponding to the target action category is switched to the triggered state. If the action category corresponding to an $(i+1)^{th}$ video frame is still the target action category, the data processing device does not make a determination result that the interactive object makes the interactive action again.

If the accumulated feature value of the target action category is less than the trigger threshold, the state corresponding to the target action category is switched from the triggered state to the to-be-triggered state. Therefore, when the accumulated feature value of the target action category reaches the trigger threshold again according to the action category corresponding to the subsequent video frame, it can be determined again that the interactive object makes the interactive action corresponding to the target action category, improving the accuracy of interactive action recognition.

Because the corresponding feature value continues to accumulate when the target action category corresponding to the same interactive action appears continuously, the excessively high accumulate value may cause the feature value of the target action category to be higher than the trigger threshold even if the interactive object does not make the interactive action for a long time. In this case, if the interactive object wants to make the interactive action corresponding to the target action category to interact with the data processing device, since the state of the target action category is still in the triggered state at this time, the data processing device does not recognize the interactive action made by the interactive object, and therefore cannot perform normal interaction with the interactive object.

In one embodiment, an accumulation upper limit higher than the trigger threshold and an accumulation lower limit less than the trigger threshold may be set for feature value accumulation, so that the feature value is between the accumulation upper limit and the accumulation lower limit during the feature value accumulation.

The function of the accumulation upper limit is not to accumulate the feature value excessively high, resulting in excessively long time to decrease to the trigger threshold afterward.

The function of the accumulation lower limit is not to decrease the feature value excessively low, which requires the interactive object to continue to make the interactive action before the feature value is increased to the trigger threshold, and determines the interactive action made by the interactive object.

Next, the feature value accumulation method and the state switching method mentioned in the embodiments of the present disclosure are described with the figures. In the four coordinate systems shown in FIG. 9, the horizontal coordinates are playing time directions of the video frames, and the horizontal coordinates have the same progress.

Figure 9:
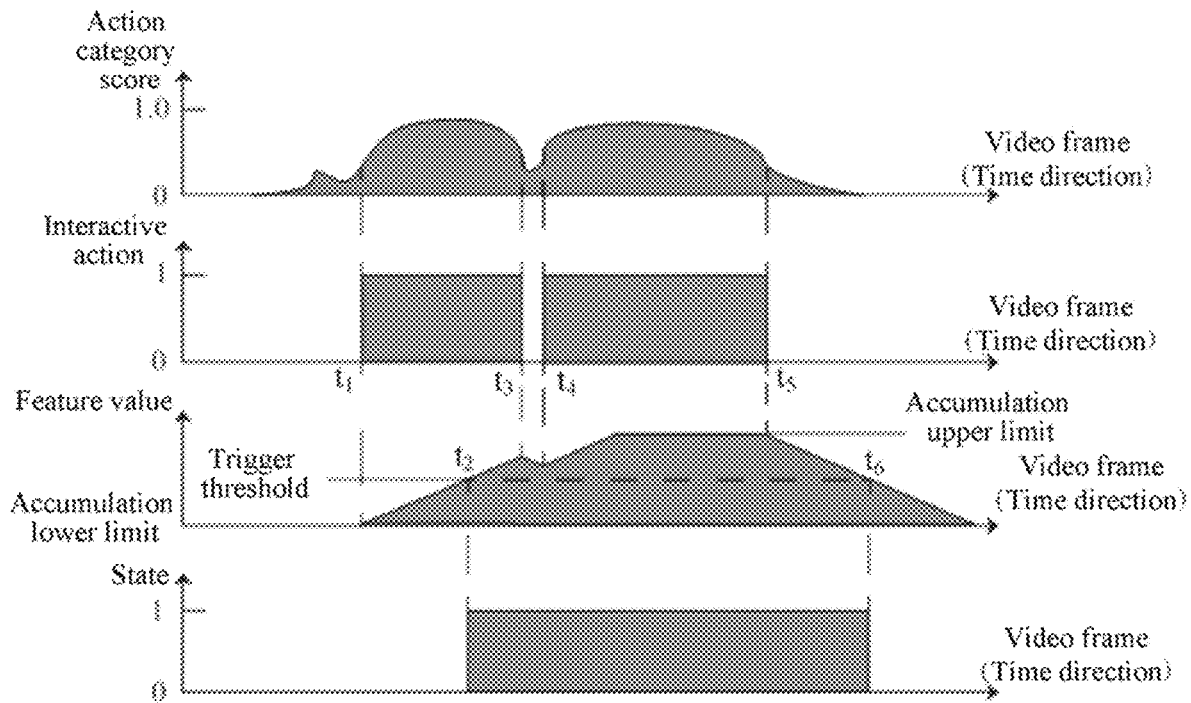
FIG. 9 is a schematic diagram of an action recognition method based on feature value accumulation and state switching according to an embodiment of the present disclosure.

From the top to bottom of FIG. 9, the first coordinate system is used to identify the possibility of the target action category, and the second coordinate system is used to identify the time period in which the possibility of the target action category is high. For example, in the t1-t3 period and t4-t5 period, the possibility of the target action category is high, which can reflect that the interactive object may make the corresponding interactive action.

The third coordinate system shows the accumulation of the feature value of the target action category, and the vertical coordinates show the accumulation lower limit, trigger threshold, and accumulation upper limit. The fourth coordinate system shows the state of the target action category, 1 represents the triggered state, and 0 represents the to-be-triggered state.

From these four coordinate systems, it can be seen that the possibility reflected by the target action category of the video frames in the 0-t1 period is low, and the possibility represented by the target action category in the t1-t3 period is high, which can reflect that the interactive object may make the corresponding interactive action, so as to start accumulating the feature value corresponding to the target action category. When the video frame at time t2 is selected, the accumulated feature value reaches the trigger threshold, the state corresponding to the target action category is switched from the to-be-triggered state to the triggered state, it is determined that the interactive object makes the interactive action corresponding to the target action category, and the data processing device responds to this.

Since the possibility represented by the target action category of the video frame in the t2-t3 period is high, the corresponding feature value is continuously increased.

Since the possibility represented by the target action category of the video frame in the t3-t4 period is low, the corresponding feature value is continuously reduced.

Since the possibility represented by the target action category of the video frame in the t4-t5 period is high, the corresponding feature value is continuously increased. During the feature value increase, the feature value accumulation reaches the accumulation upper limit, and the feature value is no longer increased.

Since the possibility represented by the target action category of the video frame in the t5-t6 period is low, the corresponding feature value is continuously reduced. When the video frame at time t6 is selected, the accumulated feature value is less than the trigger threshold, and the state of the target action category is switched to the to-be-triggered state.

In the t2-t6 period, since the state of the target action category is the triggered state, even if the feature value keeps greater than the trigger threshold, the data processing device does not repeatedly determine that the interactive object makes multiple interactive actions corresponding to the target action category.

The subsequent video frames do not have the corresponding target action category, or the interactive object does not make the interactive action, which causes the feature value of the target action category to continue to decrease and stop until the accumulation lower limit.

Figure 10:
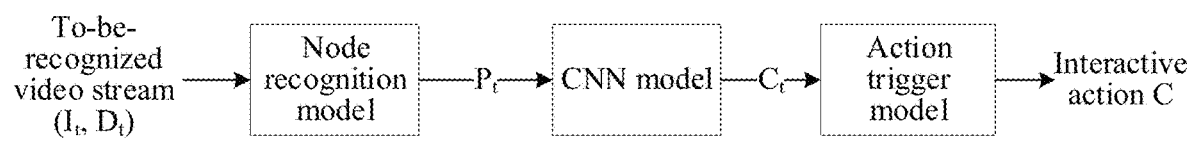
FIG. 10 is a system structure diagram of an action recognition system according to an embodiment of the present disclosure.

Based on the foregoing expanded description for different steps, it is clear that the steps S201-S203 in the embodiments of the present disclosure may all be completed by using a network model involving AI. For example, as shown in FIG. 10, the video data may be an RGBD (e.g., RGB+Depth) video stream (It, Dt) with depth information. It, Dt is used as the input data of the node recognition model, and the node sequence information (Pt) corresponding to the video frame in the video stream may be determined. Pt is used as the input data of the CNN model used for recognizing the action category, and the action category sequence (Ct) of the video frame in the video stream may be determined. Ct is used as the input data of an action trigger model, and the interactive action C made by the interactive object may be recognized according to the foregoing feature value accumulation and state switching mechanism.

In an embodiment of the present disclosure, actions of the interactive object are recognized based on the video stream including RGB images and depth maps acquired by a depth camera, and an end-to-end complete algorithm system from inputting the video stream to outputting instructions to smart devices for intelligent interaction is designed. In an embodiment of the present disclosure, in the case of ensuring real-time performance, the recognition of action instances on a self-built data set achieves an accuracy of 92.93% and a recall rate of 91.82%, which has the applicability in the human-machine interaction scenario. In the algorithm system provided in an embodiment of the present disclosure, the human body joint points outputted by the skeleton extraction module and the action category to be recognized may be adjusted according to actual application requirements, which has good flexibility and scalability.

Figure 11:
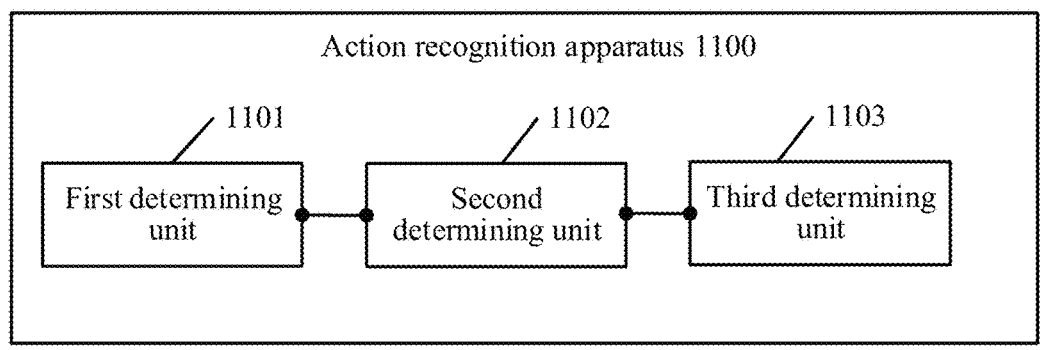
FIG. 11 is an apparatus structure diagram of an action recognition apparatus according to an embodiment of the present disclosure.

FIG. 11 is an apparatus structure diagram of an action recognition apparatus according to an embodiment of the present disclosure. The action recognition apparatus 1100 includes a first determining unit 1101, a second determining unit 1102, and a third determining unit 1103.

The first determining unit 1101 is configured to determine, according to video data including an interactive object, node sequence information corresponding to video frames in the video data, the node sequence information being used for identifying position information of nodes in the node sequence that are used by the interactive object to implement an interactive action.

The second determining unit 1102 is configured to determine, according to node sequence information corresponding to N consecutive video frames in the video data, action categories respectively corresponding to the N consecutive video frames.

The third determining unit 1103 is configured to determine, according to action categories corresponding to the video frames in the video data, the interactive action made by the interactive object.

Optionally, the second determining unit is further configured to:

generate a three-dimensional tensor according to the node sequence information corresponding to the N consecutive video frames in the video data, the three-dimensional tensor including a video frame dimension, a node dimension in the node sequence, and a position information dimension of the node; and determine, according to the three-dimensional tensor, the action categories respectively corresponding to the N consecutive video frames by using a convolutional neural network (CNN) model.

Optionally, the CNN model includes a first submodel, a second submodel, and a classification submodel, the first submodel is used for determining an action posture feature of the interactive object in any one of the N consecutive video frames according to the three-dimensional tensor, the second submodel is used for determining a change rule of a time-varying action posture of the interactive object in the N consecutive video frames according to the action posture feature, and the classification submodel is used for determining the action categories respectively corresponding to the N consecutive video frames according to the change rule.

Optionally, the first submodel includes a first attention module, a feature proportion of a target node in the action posture feature is increased through guidance of the first attention module to the first submodel, and the target node is a node in the node sequence whose motion amplitude in adjacent video frames is greater than a preset distance.

Optionally, the second submodel includes a second attention module, and through guidance of the second attention module to the second submodel, the change rule of the time-varying action posture in any frame is determined with reference to information corresponding to a plurality of frames preceding the frame and a plurality of frames subsequent to the frame.

Optionally, the action recognition apparatus further includes a fourth determining unit. The fourth determining unit is configured to sequentially determine the N consecutive video frames in a preset time window length from the video data according to a time window movement step, the time window movement step being less than N.

Optionally, for the target video frame in the video data, the second determining unit is further configured to:

obtain action categories of the target video frame that are determined in different preset time window lengths; and determine an action category of the target video frame according to the action categories determined in different preset time window lengths.

Optionally, the third determining unit is further configured to:

calculate a feature value based on an order of the video frames according to action categories corresponding to the video frames in the video data, the feature value being used for reflecting continuity of the action categories in a time dimension; and determine, when an accumulated feature value of a target action category reaches a trigger threshold, the interactive action corresponding to the target action category made by the interactive object.

Optionally, the third determining unit is further configured to:

after the determining the interactive action corresponding to the target action category made by the interactive object, switch a state corresponding to the target action category from a to-be-triggered state to a triggered state, and in the triggered state, when the accumulated feature value of the target action category reaches the trigger threshold, skip performing the operation of determining the interactive action corresponding to the target action category made by the interactive object; and when the accumulated feature value of the target action category is less than the trigger threshold, switch the state corresponding to the target action category from the triggered state to the to-be-triggered state, and in the to-be-triggered state, when the accumulated feature value of the target action category reaches the trigger threshold, determine the interactive action corresponding to the target action category made by the interactive object.

Optionally, an accumulation upper limit higher than the trigger threshold and an accumulation lower limit less than the trigger threshold are set for feature value accumulation, so that the feature value is between the accumulation upper limit and the accumulation lower limit during the feature value accumulation of the third determining unit.

Optionally, the first determining unit is further configured to:

extract an image feature of the video frames in the video data; and determine, according to the image feature, the node sequence information corresponding to the video frames in the video data by using a node recognition model.

Optionally, the node recognition model includes a plurality of layers of prediction submodels, any layer of prediction submodel includes a node prediction module and a link prediction module, the node prediction module is used for determining position information of nodes in the video frames, and the link prediction module is used for determining link information between nodes.

Optionally, the node recognition model is used for recognizing node sequence information in a specified part of the interactive object.

The implementation and related descriptions of each unit in the embodiment corresponding to FIG. 11 may refer to the description in the embodiments corresponding to FIG. 1 to FIG. 10, and details are not described herein.

It can be seen that, for the video data including the interactive object, the node sequence information corresponding to the video frames in the video data may be determined, a plurality of nodes in the node sequence are nodes used by the interactive object to implement the interactive action, and the node sequence information may reflect the position information of the nodes in the node sequence. N consecutive video frames are determined from the video data, and the action categories respectively corresponding to the N consecutive video frames are determined according to the node sequence information respectively corresponding to the N consecutive video frames, so that which interactive action the interactive object makes may be determined according to action categories corresponding to the video frames in the video data. It can be learned that, action categories corresponding to a video frame are determined with reference to information carried by N consecutive video frames where the video frame is located or with reference to relevant information of the video frame in the past and/or future time, thereby introducing more effective information. Even if a non-dedicated action recognition acquisition apparatus is used to obtain the video data, this method of determining action categories corresponding to each video frame based on a set of consecutive video frames can also achieve a relatively good action recognition accuracy, thereby reducing an application range and implementation costs in intelligent interaction scenarios.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 12:
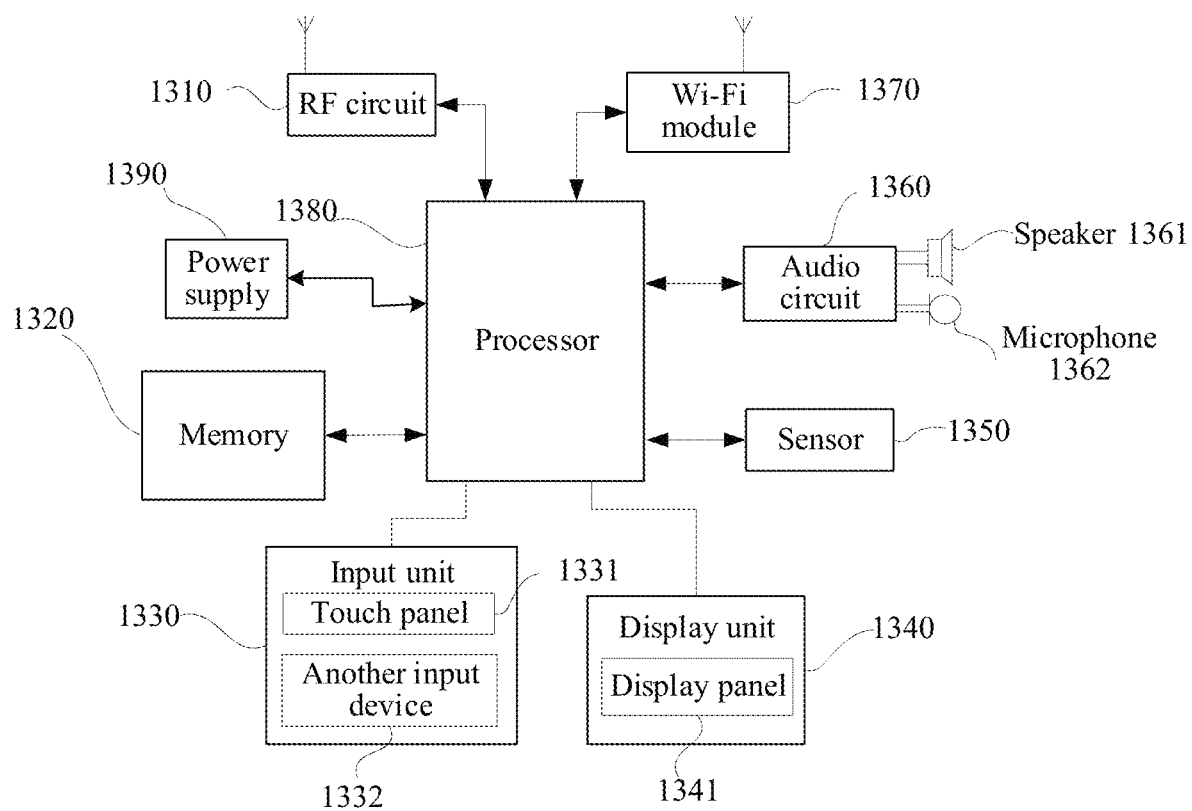
FIG. 12 is a structural diagram of an action recognition device according to an embodiment of the present disclosure.

An embodiment of the present disclosure further provides an action recognition device, and the device may be the data processing device mentioned in the foregoing embodiments. The device is described below with reference to the accompanying drawings. Referring to FIG. 12, an embodiment of the present disclosure provides an action recognition device, and the device may be a terminal device. The terminal device may be any smart terminal including a mobile phone, a tablet computer, a PDA, a point of sales (POS), or an on-board computer. The terminal device being a mobile phone is used as an example.

FIG. 12 is a block diagram of a structure of a part of a mobile phone related to a terminal device according to an embodiment of the present disclosure. Referring to FIG. 12, the mobile phone includes components such as a radio frequency (RF) circuit 1310, a memory 1320, an input unit 1330, a display unit 1340, a sensor 1350, an audio circuit 1360, a wireless fidelity (Wi-Fi) module 1370, a processor 1380, and a power supply 1390. A person skilled in the art may understand that the structure of the mobile phone shown in FIG. 12 does not constitute a limitation on the mobile phone, and the mobile phone may include more or fewer components than those shown in the figure, or some components may be combined, or a different component deployment may be used.

The following describes the components of the mobile phone with reference to FIG. 12 in detail.

The RF circuit 1310 may be configured to send and receive signals during an information receiving and sending process or a call process. Specifically, the RF circuit receives downlink information from a base station, then delivers the downlink information to the processor 1380 for processing, and sends designed uplink data to the base station. Generally, the RF circuit 1310 includes, but is not limited to, an antenna, at least one amplifier, a transceiver, a coupler, a low noise amplifier (LNA), a duplexer, and the like. In addition, the RF circuit 1310 may also communicate with a network and another device by wireless communication. The wireless communication may use any communication standard or protocol, including, but not limited to a Global System for Mobile communications (GSM), a general packet radio service (GPRS), code division multiple access (CDMA), wideband code division multiple access (WCDMA), Long Term Evolution (LTE), an email, a short messaging service (SMS), and the like.

The memory 1320 may be configured to store a software program and module. The processor 1380 runs the software program and module stored in the memory 1320, to implement various functional applications and data processing of the mobile phone. The memory 1320 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 1320 may include a high-speed random access memory, and may also include a nonvolatile memory, for example, at least one magnetic disk storage device, a flash memory, or another volatile solid-state storage device.

The input unit 1330 may be configured to receive inputted digit or character information, and generate a keyboard signal input related to the user setting and function control of the mobile phone. Specifically, the input unit 1330 may include a touch panel 1331 and another input device 1332. The touch panel 1331, which may also be referred to as a touch screen, may collect a touch operation of a user on or near the touch panel 1331 (such as an operation of a user on the touch panel 1331 or near the touch panel 1331 by using any suitable object or accessory such as a finger or a stylus), and drive a corresponding connection apparatus according to a preset program. Optionally, the touch panel 1331 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and sends the touch point coordinates to the processor 1380. Moreover, the touch controller can receive and execute a command sent from the processor 1380. In addition, the touch panel 1331 may be implemented by using various types, such as a resistive type, a capacitance type, an infrared type, and a surface acoustic wave type. In addition to the touch panel 1331, the input unit 1330 may further include the another input device 1332. Specifically, the another input device 1332 may include, but is not limited to, one or more of a physical keyboard, a functional key (for example, a volume control key or a switch key), a track ball, a mouse, and a joystick.

The display unit 1340 may be configured to display information inputted by the user or information provided for the user, and various menus of the mobile phone. The display unit 1340 may include a display panel 1341. Optionally, the display panel 1341 may be configured in the form of a liquid crystal display (LCD), an organic light-emitting diode (OLED), or the like. Further, the touch panel 1331 may cover the display panel 1341. After detecting a touch operation on or near the touch panel 1331, the touch panel transfers the touch operation to the processor 1380, to determine a type of a touch event. Then, the processor 1380 provides a corresponding visual output on the display panel 1341 according to the type of the touch event. Although in FIG. 12, the touch panel 1331 and the display panel 1341 are used as two separate parts to implement input and output functions of the mobile phone, in some embodiments, the touch panel 1331 and the display panel 1341 may be integrated to implement the input and output functions of the mobile phone.

The mobile phone may further include at least one sensor 1350 such as an optical sensor, a motion sensor, and other sensors. Specifically, the optical sensor may include an ambient light sensor and a proximity sensor. The ambient light sensor may adjust luminance of the display panel 1341 according to brightness of the ambient light. The proximity sensor may switch off the display panel 1341 and/or backlight when the mobile phone is moved to the ear. As one type of motion sensor, an acceleration sensor can detect magnitude of accelerations in various directions (generally on three axes), may detect magnitude and a direction of the gravity when being static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1360, a speaker 1361, and a microphone 1362 may provide audio interfaces between a user and the mobile phone. The audio circuit 1360 may convert received audio data into an electrical signal and transmit the electrical signal to the speaker 1361. The speaker 1361 converts the electrical signal into a sound signal for output. On the other hand, the microphone 1362 converts a collected sound signal into an electrical signal. The audio circuit 1360 receives the electrical signal, converts the electrical signal into audio data, and outputs the audio data to the processor 1380 for processing. Then, the processor 1380 sends the audio data to, for example, another mobile phone by using the RF circuit 1310, or outputs the audio data to the memory 1320 for further processing.

Wi-Fi is a short distance wireless transmission technology. The mobile phone may help, by using the Wi-Fi module 1370, a user to receive and transmit an email, browse a web page, access stream media, and the like. This provides wireless broadband Internet access for the user. Although FIG. 12 shows the Wi-Fi module 1370, it may be understood that the Wi-Fi module is not a necessary component of the mobile phone, and the Wi-Fi module may be omitted as required provided that the scope of the essence of the present disclosure is not changed.

The processor 1380 is a control center of the mobile phone, and is connected to various parts of the entire mobile phone by using various interfaces and lines. By running or executing a software program and/or module stored in the memory 1320, and invoking data stored in the memory 1320, the processor 1380 executes various functions of the mobile phone and performs data processing, thereby monitoring the entire mobile phone. Optionally, the processor 1380 may include one or more processing units. Preferably, the processor 1380 may integrate an application processor and a modem processor. The application processor mainly processes an operating system, a user interface, an application, and the like. The modem processor mainly processes wireless communication. It may be understood that the modem processor may alternatively not be integrated into the processor 1380.

The mobile phone further includes the power supply 1390 (such as a battery) for supplying power to the components. Preferably, the power supply may be logically connected to the processor 1380 by using a power management system, thereby implementing functions such as charging, discharging, and power consumption management by using the power management system.

Although not shown in the figure, the mobile phone may further include a camera, a Bluetooth module, and the like. Details are not described herein again.

In this embodiment of the present disclosure, the processor 1380 included in the terminal device further has the following functions:

determining, according to video data including an interactive object, node sequence information corresponding to video frames in the video data, the node sequence information being used for identifying position information of nodes in the node sequence that are used by the interactive object to implement an interactive action;

determining, according to node sequence information corresponding to N consecutive video frames in the video data, action categories respectively corresponding to the N consecutive video frames; and determining, according to action categories corresponding to the video frames in the video data, the interactive action made by the interactive object.

Figure 13:
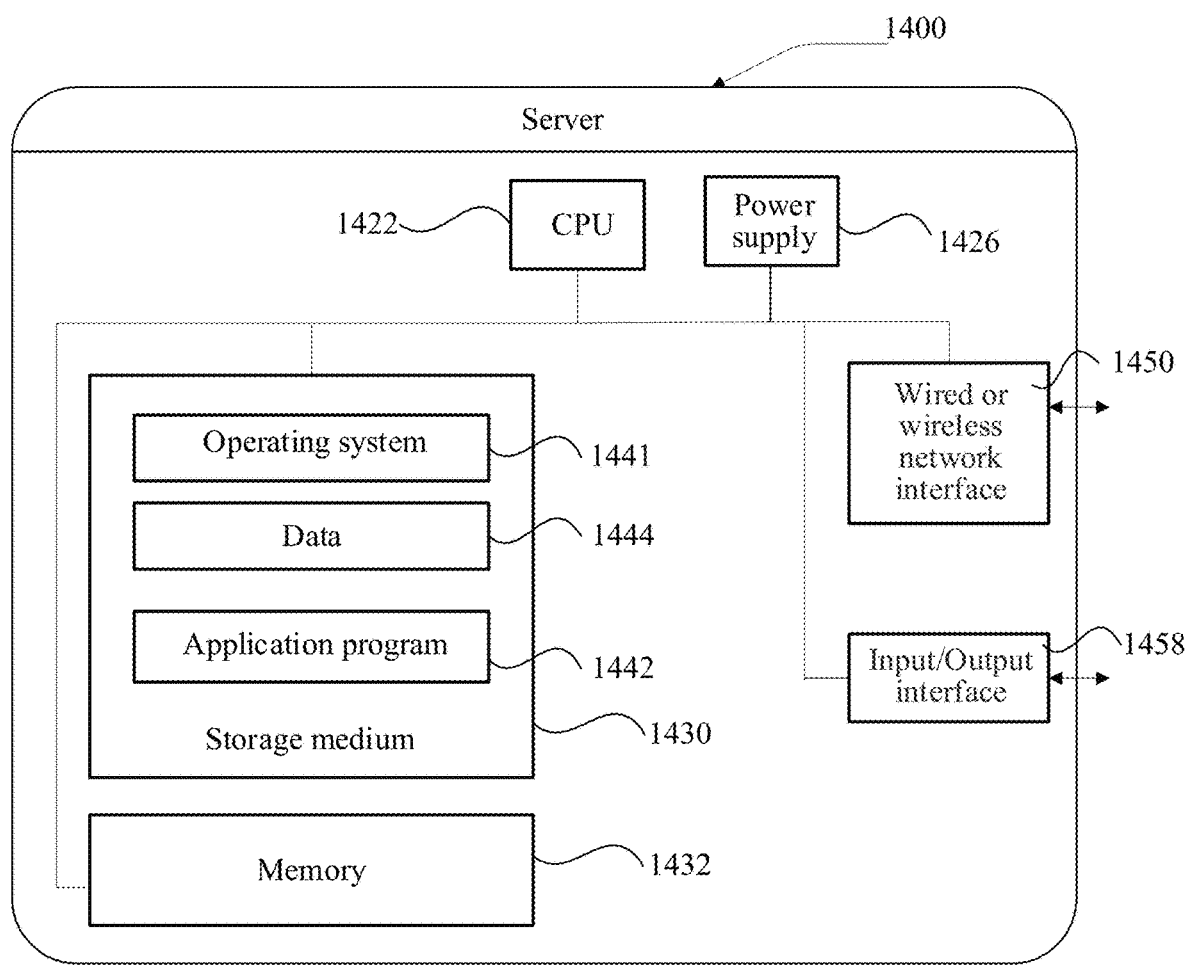
FIG. 13 is a structural diagram of a server according to an embodiment of the present disclosure.

The data processing device provided in this embodiment of the present disclosure may be a server. FIG. 13 is a schematic structural diagram of a server 1400 according to an embodiment of the present disclosure. The server 1400 may vary greatly due to different configurations or performance, and may include one or more central processing units (CPU) 1422 (for example, one or more processors) and a memory 1432, and one or more storage mediums 1430 (for example, one or more mass storage devices) that store an application program 1442 or data 1444. The memory 1432 and the storage medium 1430 may implement transient storage or permanent storage. The program stored in the storage medium 1430 may include one or more modules (not shown in the figure), and each module may include a series of instruction operations on the server. Further, the CPU 1422 may be configured to communicate with the storage medium 1430, and perform, on the server 1400, the series of instruction operations in the storage medium 1430.

The server 1400 may further include one or more power supplies 1426, one or more wired or wireless network interfaces 1450, one or more input/output interfaces 1458, and/or one or more operating systems 1441 such as Windows Server™, Mac OS X™, Unix™, Linux™, or FreeBSD™.

The steps in the foregoing embodiments may alternatively be performed by a server, and the server may be based on the server structure shown in FIG. 13.

An embodiment of the present disclosure further provides a computer-readable storage medium, configured to store program code, the program code being used for performing the action recognition method according to the foregoing embodiments.

An embodiment of the present disclosure further provides a computer program product including instructions, the instructions, when being run on a computer, causing the computer to perform the action recognition drive method according to the foregoing embodiments.

In the specification and the accompanying drawings of the present disclosure, the terms "first", "second", "third", "fourth", and the like (if existing) are intended to distinguish between similar objects rather than describe a specific sequence or a precedence order. Data used in this way is interchangeable in a suitable case, so that the embodiments of the present disclosure described herein can be implemented in a sequence in addition to the sequence shown or described herein. Moreover, the terms "include", "contain", and any other variants thereof mean to cover the nonexclusive inclusion. For example, a process, method, system, product, or device that includes a list of steps or units is not necessarily limited to those steps or units that are clearly listed, but may include other steps or units not expressly listed or inherent to such a process, method, system, product, or device.

In the present disclosure, "at least one" means one or more, and "a plurality of" means two or more. The term "and/or" describes an association between associated objects and represents that three associations may exist. For example, "A and/or B" may indicate that only A exists, only B exists, and both A and B exist, where A and B may be singular or plural. The character "/" in this specification generally indicates an "or" relationship between the associated objects. "At least one of the following" or a similar expression thereof refers to any combination of these items, including one item or any combination of more items. For example, at least one of a, b, or c may indicate: a, b, c, "a and b", "a and c", "b and c", or "a, b, and c", where a, b, and c may be singular or plural.

In the embodiments provided in the present disclosure, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be omitted or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to an actual requirement to achieve the objectives of the solutions in the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related art, or all or a part of the technical solutions may be implemented in the form of a software product. The computer software product is stored in a storage medium and includes several instructions for instructing a computer device (which may be a PC, a server or a network device) to perform all or some of the steps of the method described in the embodiments of the present disclosure. The foregoing storage medium includes: any medium that can store program code, such as a USB flash drive, a removable hard disk, a read-only memory (ROM), a random access memory (RAM), a magnetic disk, or an optical disk.

The foregoing embodiments are used for describing, instead of limiting the technical solutions of the present disclosure. A person of ordinary skill in the art shall understand that although the present disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the present disclosure.

What is claimed is:

1. An action recognition method, performed by a data processing device, the method comprising:
   determining, according to video data comprising an interactive object, node sequence information corresponding to video frames in the video data, the node sequence information of each video frame including position information of nodes in a node sequence, the nodes in the node sequence being nodes of the interactive object that are moved to implement a corresponding interactive action;
   determining action categories corresponding to the video frames in the video data, comprising: determining, according to the node sequence information corresponding to N consecutive video frames in the video data, action categories respectively corresponding to the N consecutive video frames; and
   determining, according to the action categories corresponding to the video frames in the video data, a target interactive action made by the interactive object in the video data,
   wherein determining the node sequence information corresponding to the video frames in the video data comprises:
   extracting an image feature of the video frames in the video data; and
   determining, according to the image feature, the node sequence information corresponding to the video frames in the video data by using a node recognition model,
   wherein the node recognition model is a neural network model that comprises a plurality of layers of prediction submodels, each layer of prediction submodel being configured to determine position information of nodes in the video frames and determine link information between nodes.

2. The method according to claim 1, wherein the determining, according to node sequence information corresponding to N consecutive video frames in the video data, action categories respectively corresponding to the N consecutive video frames comprises:
   generating a three-dimensional tensor according to the node sequence information corresponding to the N consecutive video frames in the video data; and
   determining, according to the three-dimensional tensor, the action categories respectively corresponding to the N consecutive video frames by using a convolutional neural network (CNN) model.

3. The method according to claim 2, wherein the CNN model comprises a first submodel, a second submodel, and a classification submodel, and determining the action categories respectively corresponding to the N consecutive video frames comprises:
   determining, by using the first submodel, an action posture feature of the interactive object in any one of the N consecutive video frames according to the three-dimensional tensor;

determining, by using the second submodel, a change rule of a time-varying action posture of the interactive object in the N consecutive video frames according to the action posture feature; and determining, by using the classification submodel, the action categories respectively corresponding to the N consecutive video frames according to the change rule.

4. The method according to claim 3, wherein the first submodel comprises a first attention module, a feature proportion of a target node in the action posture feature is increased through guidance of the first attention module to the first submodel, and the target node is a node in the node sequence whose motion amplitude in adjacent video frames is greater than a preset distance.

5. The method according to claim 3, wherein the second submodel comprises a second attention module, and through guidance of the second attention module to the second submodel, the change rule of the time-varying action posture in a video frame is determined with reference to information corresponding to a plurality of frames preceding the video frame and a plurality of frames subsequent to the video frame.

6. The method according to claim 1, further comprising: sequentially determining the N consecutive video frames in a preset time window length from the video data according to a time window movement step, the time window movement step being less than N.

7. The method according to claim 6, wherein for a target video frame in the video data, the determining, according to node sequence information corresponding to N consecutive video frames in the video data, action categories respectively corresponding to the N consecutive video frames comprises:
obtaining action categories of the target video frame that are determined in different preset time window lengths; and
determining an action category of the target video frame according to the action categories determined in different preset time window lengths.

8. The method according to claim 1, wherein the determining, according to the action categories corresponding to the video frames in the video data, the target interactive action made by the interactive object comprises:
calculating a feature value based on an order of the video frames according to the action categories corresponding to the video frames in the video data, the feature value reflecting continuity of the action categories in a time dimension; and
determining, when an accumulated feature value of a target action category reaches a trigger threshold, the target interactive action corresponding to the target action category made by the interactive object.

9. The method according to claim 8, wherein after the determining the target interactive action corresponding to the target action category made by the interactive object, the method further comprises:
switching a state corresponding to the target action category from a to-be-triggered state to a triggered state, and in the triggered state, when the accumulated feature value of the target action category reaches the trigger threshold, skipping performing the operation of determining the target interactive action corresponding to the target action category made by the interactive object; and
when the accumulated feature value of the target action category is less than the trigger threshold, switching the state corresponding to the target action category from the triggered state to the to-be-triggered state, and in the to-be-triggered state, when the accumulated feature value of the target action category reaches the trigger threshold, determining the target interactive action corresponding to the target action category made by the interactive object.

10. The method according to claim 9, wherein an accumulation upper limit higher than the trigger threshold and an accumulation lower limit less than the trigger threshold are set for feature value accumulation, and the feature value is between the accumulation upper limit and the accumulation lower limit during the feature value accumulation.

11. The method according to claim 1, wherein each layer of prediction submodel comprises a node prediction module and a link prediction module, the node prediction module is configured to determine the position information of nodes in the video frames, and the link prediction module is configured to determine the link information between the nodes.

12. The method according to claim 1, wherein the node recognition model is configured to recognize the node sequence information in a specified part of the interactive object.

13. An action recognition device, comprising a processor and a memory, wherein
the memory is configured to store program code and transmit the program code to the processor; and
the processor is configured, according to instructions in the program code, to perform:
determining, according to video data comprising an interactive object, node sequence information corresponding to video frames in the video data, the node sequence information of each video frame including position information of nodes in a node sequence, the nodes in the node sequence being nodes of the interactive object that are moved to implement a corresponding interactive action;
determining action categories corresponding to the video frames in the video data, comprising: determining, according to the node sequence information corresponding to N consecutive video frames in the video data, action categories respectively corresponding to the N consecutive video frames; and
determining, according to the action categories corresponding to the video frames in the video data, a target interactive action made by the interactive object in the video data,
wherein determining the node sequence information corresponding to the video frames in the video data comprises:
extracting an image feature of the video frames in the video data; and
determining, according to the image feature, the node sequence information corresponding to the video frames in the video data by using a node recognition model,
wherein the node recognition model is a neural network model that comprises a plurality of layers of prediction submodels, each layer of prediction submodel being configured to determine position information of nodes in the video frames and determine link information between nodes.

14. The device according to claim 13, wherein the determining, according to node sequence information corresponding to N consecutive video frames in the video data, action categories respectively corresponding to the N consecutive video frames comprises:

generating a three-dimensional tensor according to the node sequence information corresponding to the N consecutive video frames in the video data; and determining, according to the three-dimensional tensor, the action categories respectively corresponding to the N consecutive video frames by using a convolutional neural network (CNN) model.

15. The device according to claim 14, wherein the CNN model comprises a first submodel, a second submodel, and a classification submodel, and determining the action categories respectively corresponding to the N consecutive video frames comprises:

determining, by using the first submodel, an action posture feature of the interactive object in any one of the N consecutive video frames according to the three-dimensional tensor;

determining, by using the second submodel, a change rule of a time-varying action posture of the interactive object in the N consecutive video frames according to the action posture feature; and determining, by using the classification submodel, the action categories respectively corresponding to the N consecutive video frames according to the change rule.

16. The device according to claim 15, wherein the first submodel comprises a first attention module, a feature proportion of a target node in the action posture feature is increased through guidance of the first attention module to the first submodel, and the target node is a node in the node sequence whose motion amplitude in adjacent video frames is greater than a preset distance.

17. The device according to claim 15, wherein the second submodel comprises a second attention module, and through guidance of the second attention module to the second submodel, the change rule of the time-varying action posture in a video frame is determined with reference to information corresponding to a plurality of frames preceding the video frame and a plurality of frames subsequent to the video frame.

18. The device according to claim 13, wherein the processor is further configured to perform:

sequentially determining the N consecutive video frames in a preset time window length from the video data according to a time window movement step, the time window movement step being less than N.

19. A non-transitory computer-readable storage medium, configured to store a computer program, the computer program being executed by a processor and cause the processor to perform:

determining, according to video data comprising an interactive object, node sequence information corresponding to video frames in the video data, the node sequence information of each video frame including position information of nodes in a node sequence, the nodes in the node sequence being nodes of the interactive object that are moved to implement a corresponding interactive action;

determining action categories corresponding to the video frames in the video data, comprising: determining, according to the node sequence information corresponding to N consecutive video frames in the video data, action categories respectively corresponding to the N consecutive video frames; and determining, according to the action categories corresponding to the video frames in the video data, a target interactive action made by the interactive object in the video data, wherein determining the node sequence information corresponding to the video frames in the video data comprises:

extracting an image feature of the video frames in the video data; and determining, according to the image feature, the node sequence information corresponding to the video frames in the video data by using a node recognition model, wherein the node recognition model is a neural network model that comprises a plurality of layers of prediction submodels, each layer of prediction submodel being configured to determine position information of nodes in the video frames and determine link information between nodes.

* * * * *